US012418407B2

(12) United States Patent
Elkins

(10) Patent No.: US 12,418,407 B2
(45) Date of Patent: Sep. 16, 2025

(54) MANAGEMENT, DIAGNOSTICS, AND SECURITY FOR NETWORK COMMUNICATIONS

(71) Applicant: Inside Products, Inc., Carmel Valley, CA (US)

(72) Inventor: Nalini Joshi Elkins, Carmel Valley, CA (US)

(73) Assignee: Outside the Stacks, Inc., Carmel Valley, CA (US)

( * ) Notice: Subject to any disclaimer, the term of this patent is extended or adjusted under 35 U.S.C. 154(b) by 305 days.

(21) Appl. No.: 17/954,971

(22) Filed: Sep. 28, 2022

(65) Prior Publication Data

US 2023/0108261 A1   Apr. 6, 2023

Related U.S. Application Data

(60) Provisional application No. 63/252,066, filed on Oct. 4, 2021.

(51) Int. Cl.
*H04L 9/08*   (2006.01)
*H04L 9/32*   (2006.01)

(52) U.S. Cl.
CPC .......... *H04L 9/0825* (2013.01); *H04L 9/0894* (2013.01); *H04L 9/3263* (2013.01)

(58) Field of Classification Search
CPC .... H04L 9/0825; H04L 9/0894; H04L 9/3263
USPC ...................................................... 713/171
See application file for complete search history.

(56) References Cited

U.S. PATENT DOCUMENTS

| 10,999,260 | B1* | 5/2021 | Silvestri | H04L 9/0894 |
| 11,082,217 | B1* | 8/2021 | Donlan | H04L 9/0861 |
| 2018/0324155 | A1* | 11/2018 | Leavy | G06F 16/22 |
| 2019/0068564 | A1* | 2/2019 | Putatunda | H04L 63/08 |
| 2020/0213311 | A1* | 7/2020 | Saha | H04L 9/321 |

OTHER PUBLICATIONS

Hoyland, Jonathan "An Analysis of TLS 1.3 and its use in Composite Protocols", 2018, pp. 1-273.
Polk, Tim et al., "Addressing Visibility Challenges With TLS 1.3", May 2021, pp. 1-14.

* cited by examiner

*Primary Examiner* — Linglan Edwards
*Assistant Examiner* — Phuc Pham
(74) *Attorney, Agent, or Firm* — Raubvogel Law Office

(57) ABSTRACT

A system and method securely and selectively provide visibility along a communication path in end-to-end communications, while ensuring security of the transmission, and while further ensuring that unauthorized persons cannot view network packets. A separate parallel channel is used to provide visibility into data in transit to authorized parties, without revealing such data to unauthorized parties. In at least one embodiment, the separate parallel channel is implemented using a secure group messaging platform. In addition, all needed equipment is integrated in the end-to-end connection across layers and protocols into the secure messaging group. Secure, scalable messaging groups can be based on a ratchet tree protocol so as to guarantee forward as well as post-compromise security.

24 Claims, 24 Drawing Sheets

MANAGEMENT, DIAGNOSTICS, AND SECURITY FOR NETWORK COMMUNICATIONS

CROSS-REFERENCE TO RELATED APPLICATION

The present application claims the benefit of U.S. Provisional Application Ser. No. 63/252,066 for "Improved Management, Diagnostics, and Security for Network Communications", filed on Oct. 4, 2021, which is incorporated by reference herein in its entirety.

TECHNICAL FIELD

The present document relates to network communication techniques.

BACKGROUND

Typically, in systems that employ end-to-end encrypted protocols, the decryption key is made available only to the endpoints. However, there is often a legitimate need to see the content of a network packet at locations along the communication path, in addition to at the endpoints. For example, a bank may need to view a network packet at multiple locations along the path to combat fraud. Existing systems generally fail to provide any such visibility Some existing solutions provide a control and data channel for each protocol being used in the communication. However, such approaches tend to be protocol-specific; each protocol defines its own control and data channel for its own uses. Thus, data (and channels) are duplicated, leading to inefficiency, data not being shared between devices and protocols (leading to siloing, and in some cases, resulting in one protocol or layer countermanding the information of another), and data not being standardized (since each protocol defines its own information). The result is a conflicting and confusing array of separate solutions that can be challenging or impossible to deploy effectively.

SUMMARY

Various embodiments described herein provide and enable a mechanism to securely and selectively provide visibility along a communication path in end-to-end communications, while ensuring security of the transmission, and while further ensuring that unauthorized persons cannot view network packets. The described techniques avoid the limitations of prior art systems by providing a solution that is not protocol-specific and is not unique for each individual app, product, or platform.

In at least one embodiment, the system described herein uses a separate parallel channel to provide visibility into data in transit to authorized parties, without revealing such data to unauthorized parties. In at least one embodiment, the separate parallel channel is implemented using a secure group messaging platform, such as a WhatsApp group. One skilled in the art will recognize that other platforms can be used to implement the separate parallel channel.

In addition, the techniques described herein are able to integrate all the needed equipment in the end-to-end connection across layers and protocols into a secure messaging group, such as for example a WhatsApp group. Thus, the described system avoids limitations of previous approaches that are implemented as a control and data channel between two endpoints (such as a client and server), thus often requiring two parties to participate.

In at least one embodiment, the described system maintains security by implementing visibility into network communication via secure, scalable messaging groups based on a ratchet tree protocol so as to guarantee forward security as well as post-compromise security.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION OF THE EMBODIMENTS

Figure 1:
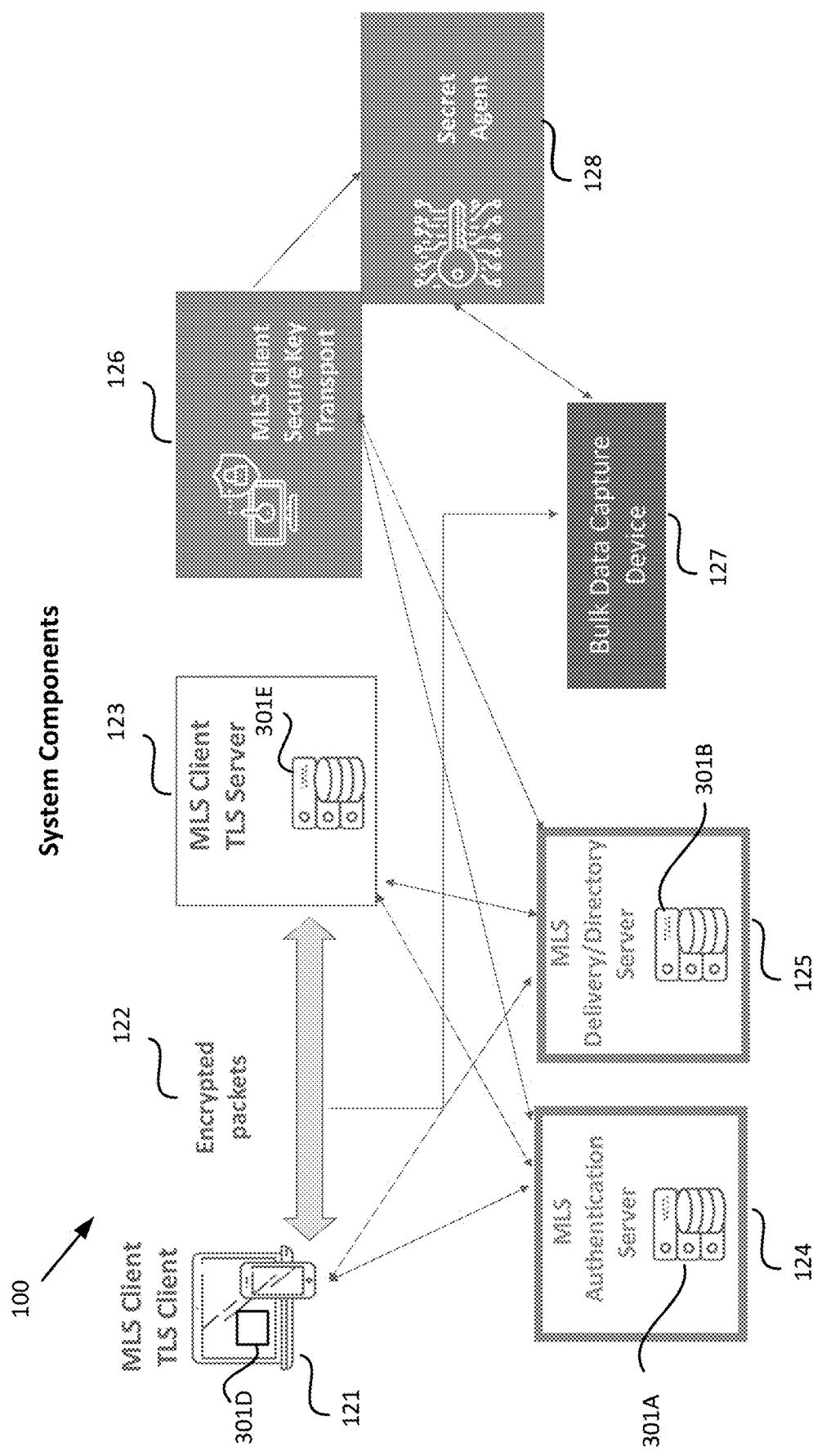
FIG. 1 is a block diagram depicting a system architecture for securely providing visibility along a communication path in end-to-end communications, according to one embodiment.

The systems and methods set forth herein may be applied in many network communication contexts in which it can be useful to gain visibility to the content of a network packet at locations along the communication path, in addition to at the endpoints. Such techniques can be useful, for example, in efforts to combat fraud by viewing network packets at multiple locations along the communication path. Accordingly, one context for the techniques presented herein is to provide improved management, diagnostics, and security for network communications by enabling visibility along a communication path.

The described techniques can also be used in other contexts, and are not limited to the particular applications described herein. For example, the described techniques can be applied in any situation or context in which it may be useful to see the content of a network packet at locations along the communication path. In addition, the particular hardware arrangements depicted and described herein are simplified examples for illustrative purposes.

In some embodiments, one or more components, as shown and described below in connection with various Figures herein, may be used to implement the system and method described herein. In at least one embodiment, such components may be implemented in a cloud computing-based client/server architecture, using, for example, Amazon Web Services, an on-demand cloud computing platform available from Amazon.com, Inc. of Seattle, Washington Therefore, for illustrative purposes, the system and method are described herein in the context of such an architecture. One skilled in the art will recognize, however, that the systems and methods described herein can be implemented using other architectures, such as for example a standalone computing device rather than a client/server architecture.

Further, the functions and/or method steps set forth herein may be carried out by software running on one or more of the device 101, client device(s) 108, server 110, and/or other components. This software may optionally be multi-function software that is used to retrieve, store, manipulate, and/or otherwise use data stored in data storage devices such as data store 106, and/or to carry out one or more other functions.

Definitions and Concepts

For purposes of the description herein, a "user", such as user 100 referenced herein, is an individual, company, business, organization, enterprise, entity, or the like, which may optionally include one or more individuals. In the context of the description herein, such individual, company, business, organization, enterprise, entity, or the like may also be referred to as an "entity" or "customer". A "data store", such as data store 106 referenced herein, is any device capable of digital data storage, including any known hardware for nonvolatile and/or volatile data storage. A collection of data stores 106 may form a "data storage system" that can be accessed by multiple users. A "computing device", such as device 101 and/or client device(s) 108, is any device capable of digital data processing. A "server", such as server 110, is a computing device that provides data storage, either via a local data store, or via connection to a remote data store. A "client device", such as client device 108, is an electronic device that communicates with a server, provides output to a user, and accepts input from a user. A "document" is any electronic or paper document, or an image representing such a document, which may include text and/or numeric information. "Content" may refer to any data or information being transmitted, viewed, manipulated, stored, input, output, or edited. A "group" is a group or similar construct that may be implemented using a secure group messaging platform, such as a WhatsApp group or the like.

For purposes of the description herein, the functionality will be set forth in terms of enabling secure visibility and/or access to network packets by authorized personnel. However, such embodiments are merely exemplary; the techniques described herein may be implemented in connection with other types of management, diagnostics, and/or security for network communications, and the descriptions set forth herein should be considered to apply to any such alternative embodiments and contexts.

Component Architecture

According to various embodiments, the systems and methods described herein can be implemented on any electronic device or set of interconnected electronic devices, each equipped to receive, store, and present information. Each electronic device may be, for example, a server, desktop computer, laptop computer, smartphone, tablet computer, and/or the like. As described herein, some devices used in connection with the systems and methods described herein are designated as client devices, which are generally operated by end users. Other devices are designated as servers, which generally conduct back-end operations and communicate with client devices (and/or with other servers) via a communications network such as the Internet. In at least one embodiment, the techniques described herein can be implemented in a cloud computing environment using techniques that are known to those of skill in the art.

In addition, one skilled in the art will recognize that the techniques described herein can be implemented in other contexts, and indeed in any suitable device, set of devices, or system capable of interfacing with existing enterprise data storage systems. Accordingly, the following description is intended to illustrate various embodiments by way of example, rather than to limit scope.

Figure 16:
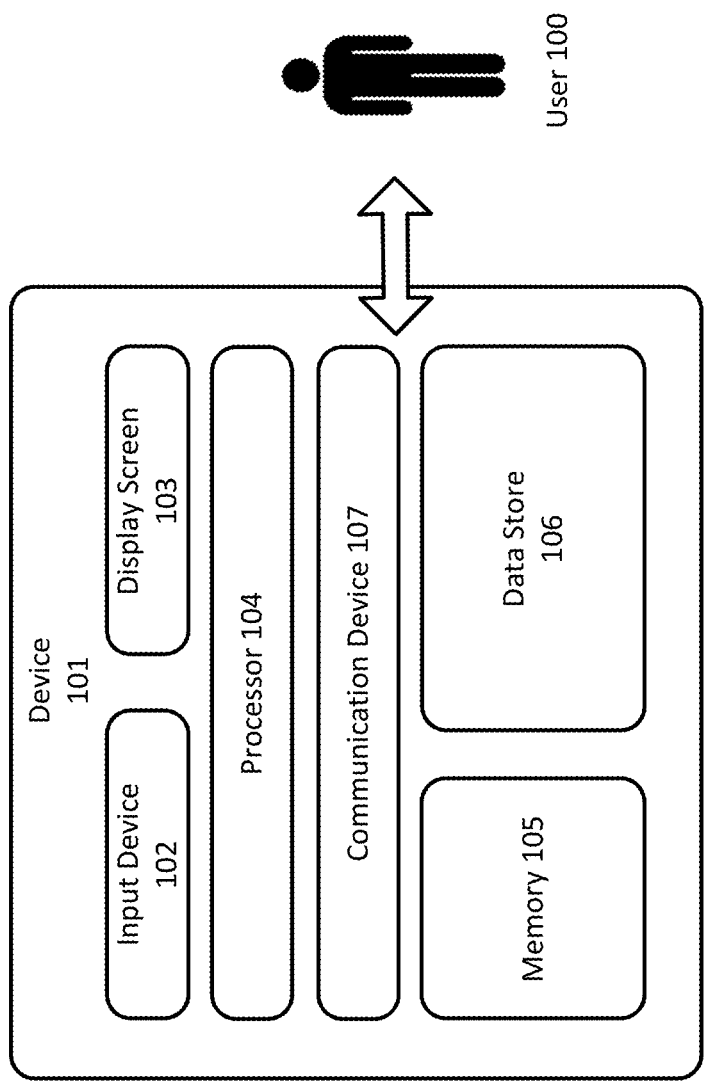
FIG. 16 is a block diagram depicting a hardware architecture for at least one component of the described system, according to one embodiment.

Referring now to FIG. 16, there is shown a block diagram depicting a hardware architecture for at least one component of the described system, according to one embodiment. Such an architecture can be used, for example, for implementing the techniques of the system in a computer or other device 101. Device 101 may be any electronic device. Any number of such devices 101 may be used in implementing the techniques described herein, and such devices 101 may be communicatively coupled with one another via any suitable means.

In at least one embodiment, device 101 includes a number of hardware components that are well known to those skilled in the art. Input device 102 can be any element that receives input from user 100, including, for example, a keyboard, mouse, stylus, touch-sensitive screen (touchscreen), touchpad, trackball, accelerometer, microphone, or the like. Input can be provided via any suitable mode, including for example, one or more of: pointing, tapping, typing, dragging, and/or speech. In at least one embodiment, input device 102 can be omitted or functionally combined with one or more other components.

Data store 106 can be any magnetic, optical, or electronic storage device for data in digital form; examples include flash memory, magnetic hard drive, CD-ROM, DVD-ROM, or the like. In at least one embodiment, data store 106 stores information that can be utilized and/or displayed according to the techniques described below. Data store 106 may be implemented in a database or using any other suitable arrangement. In another embodiment, data store 106 can be stored elsewhere, and data from data store 106 can be retrieved by device 101 when needed for processing and/or presentation to user 100. Data store 106 may store one or more data sets, which may be used for a variety of purposes and may include a wide variety of files, metadata, and/or other data.

In at least one embodiment, data store 106 may store data for enabling access to network packets at locations along a communication path. Data store 106 may also store data extracted from such packets, for use as described herein.

In at least one embodiment, such data can be stored at another location, remote from device 101, and device 101 can access such data over a network, via any suitable communications protocol.

In at least one embodiment, data store 106 may be organized in a file system, using well known storage architectures and data structures, such as relational databases. Examples include Oracle, MySQL, and PostgreSQL. Appropriate indexing can be provided to associate data elements in data store 106 with each other. Metadata associated with configuration data, and defining configuration templates and layers, can be stored in such databases using any suitable data format(s). In at least one embodiment, data store 106 may be implemented using cloud-based storage architectures such as NetApp (available from NetApp, Inc. of Sunnyvale, California) and/or Google Drive (available from Google, Inc. of Mountain View, California).

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate communication systems.

In at least one embodiment, data store 106 is detachable in the form of a CD-ROM, DVD, flash drive, USB hard drive, or the like. Information can be entered from a source outside of device 101 into a data store 106 that is detachable, and later displayed after the data store 106 is connected to device 101. In another embodiment, data store 106 is fixed within device 101.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100 on display screen 103. In at least one embodiment, an identifying label is also stored along with each data entry, to be displayed along with each data entry.

Display screen 103 can be any element that displays information such as text and/or graphical elements. In particular, display screen 103 may present a user interface for enabling secure visibility and/or access to network packets by authorized personnel. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

Communication device 107 may communicate with other computing devices through the use of any known wired and/or wireless protocol(s). For example, communication device 107 may be a network interface card ("NIC") capable of Ethernet communications and/or a wireless networking card capable of communicating wirelessly over any of the 802.11 standards. Communication device 107 may be capable of transmitting and/or receiving signals to transfer data and/or initiate various processes within and/or outside device 101. In particular, communication device 107 may communicate with other components described herein, for enabling secure access to network packets by authorized personnel.

Figure 17:
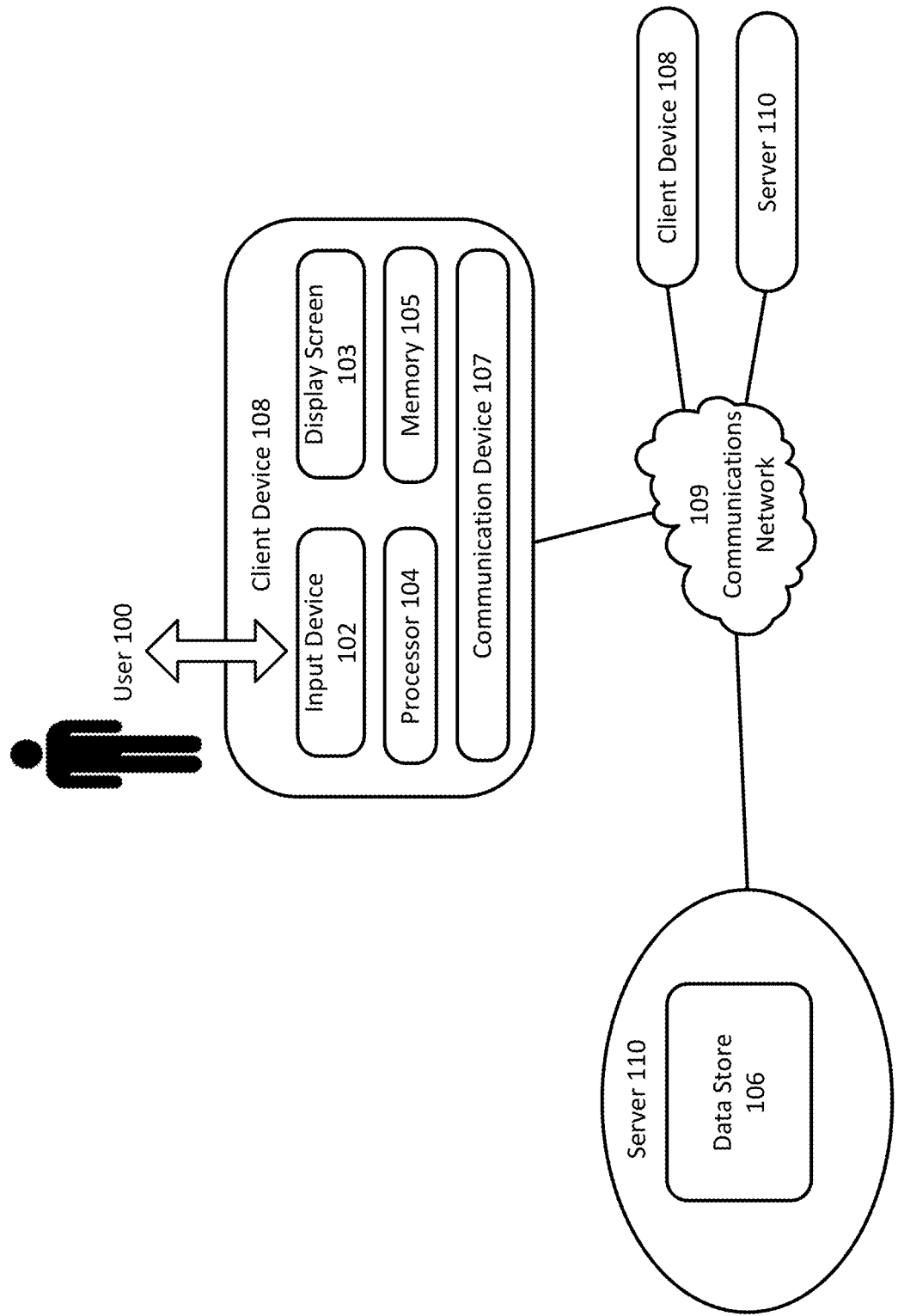
FIG. 17 is a block diagram depicting a hardware architecture for implementing the techniques described herein in a client/server environment, according to one embodiment.

Referring now to FIG. 17, there is shown a block diagram depicting a hardware architecture for implementing the techniques described herein in a client/server environment, according to one embodiment. Such an implementation may use a "black box" approach, whereby data storage and processing are done completely independently from user input/output. An example of such a client/server environment is a web-based implementation, wherein one or more client device(s) 108 run(s) a browser that provides a user interface for interacting with web pages and/or other web-based resources from one or more server(s) 110. Items from data store 106 and/or from other sources and components (such as server(s) 110) can be presented as part of such web pages and/or other web-based resources, using known protocols and languages such as Hypertext Markup Language (HTML), Java, JavaScript, and the like.

Client device(s) 108 can be any electronic device(s) incorporating input device 102 and/or display screen 103, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, can be used as the mechanism for transmitting data between client device(s) 108, server(s) 110, and/or other components described herein, according to any suitable protocols and techniques. In addition to the Internet, other examples include cellular telephone networks, EDGE, 3G, 4G, 5G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device(s) 108 may transmit requests for data via communications network 109, and may receive responses from server 110 containing the requested data. Such requests may be sent via HTTP as remote procedure calls or the like.

In one implementation, server(s) 110 may be responsible for data storage and processing, and may incorporate data store 106. Server(s) 110 may include additional components as needed for retrieving data from data store 106 in response to requests from client device(s) 108.

As described above in connection with FIG. 16, data store 106 may be organized into one or more well-ordered data sets, with one or more data entries in each set. Data store 106, however, can have any suitable structure, and may store data according to any organization system known in the information storage arts, such as databases and other suitable data storage structures. As in FIG. 16, data store 106 may store data for enabling access to network packets at locations along a communication path. In addition, data store 106 may also store data extracted from such packets, for use as described herein; alternatively, such data can be stored elsewhere (such as at another server) and retrieved as needed.

In addition to or in the alternative to the foregoing, data may also be stored in a data store 106 that is part of client device 108. In some embodiments, such data may include elements distributed between server(s) 110 and client device (s) 108 and/or other computing devices in order to facilitate secure and/or effective communication between these computing devices.

As discussed above in connection with FIG. 16, display screen 103 can be any element that displays information such as text and/or graphical elements. Various user interface elements, dynamic controls, and/or the like may be used in connection with display screen 103.

As discussed above in connection with FIG. 16, processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software. A communication device 107 may communicate with other computing devices through the use of any known wired and/or wireless protocol(s), as discussed above in connection with FIG. 16.

In one embodiment, some or all of the system can be implemented as software written in any suitable computer programming language, whether in a standalone or client/server architecture. Alternatively, it may be implemented and/or embedded in hardware.

Notably, multiple servers 110 and/or multiple client devices 108 may be networked together, and each may have a structure similar to those of client device(s) 108 and server(s) 110 that are illustrated in FIG. 17. The data structures and/or computing instructions used in the performance of methods described herein may be distributed among any number of client devices 108 and/or servers 110. As used herein, "system" may refer to any of the components, or any collection of components, from FIGS. 16 and/or 17, and may include additional components not specifically described in connection with FIGS. 16 and 17.

In some embodiments, data within data store 106 may be distributed among multiple physical servers. Thus, data store 106 may represent one or more physical storage locations, which may communicate with each other via the communications network and/or one or more other networks (not shown). In addition, server(s) 110 as depicted in FIG. 17 may represent one or more physical servers, which may communicate with each other via communications network 109 and/or one or more other networks (not shown).

In one embodiment, some or all components of the system can be implemented in software written in any suitable computer programming language, whether in a standalone or client/server architecture. Alternatively, some or all components may be implemented and/or embedded in hardware.

Overview

As mentioned above, the described system provides and enables a standardized communication path that securely and selectively provides visibility along a communication path in end-to-end communications, while ensuring security of the transmission, and while further ensuring that unauthorized persons cannot view network packets. In at least one embodiment, the system described herein uses a separate parallel channel to provide visibility into data in transit to authorized parties, without revealing such data to unauthorized parties. In at least one embodiment, the separate parallel channel is implemented using a secure group messaging platform, such as a WhatsApp group. One skilled in the art will recognize that other platforms can be used to implement the separate parallel channel.

In at least one embodiment, there are two connections between the parties in the group. The main or data session takes place between the participants via a two-party protocol such as TLS. For example, a connection between a customer and their bank might be established with the customer's browser as a TLS client and the bank as a TLS server.

According to the techniques described herein, a parallel session is established between the various network devices that act together to make the data session work. In the above example, the TLS server at the bank may be a web server (Apache). If the customer requests their account balance, the web server performs a separate call to a database server to retrieve the account balance. The database server joins the group for this session.

In some situations, there may be multiple database servers, and the web server may also be retrieving data for other clients. The system and method described herein provide techniques to determine which database server and which session should be added to the group. In at least one embodiment, the separate parallel channel can decipher a part of the metadata or payload to match these sessions and to add the proper device and/or session to the appropriate group.

In addition, the techniques described herein provide functionality for integrating all required equipment in the end-to-end connection across layers and protocols into a secure messaging group, such as for example a WhatsApp group.

In at least one embodiment, the described system is more robust than existing systems, and combines several techniques that are able to interoperate with one another so as to provide the described benefits in many different contexts and environments, including complex multi-vendor environments.

Figure 15:
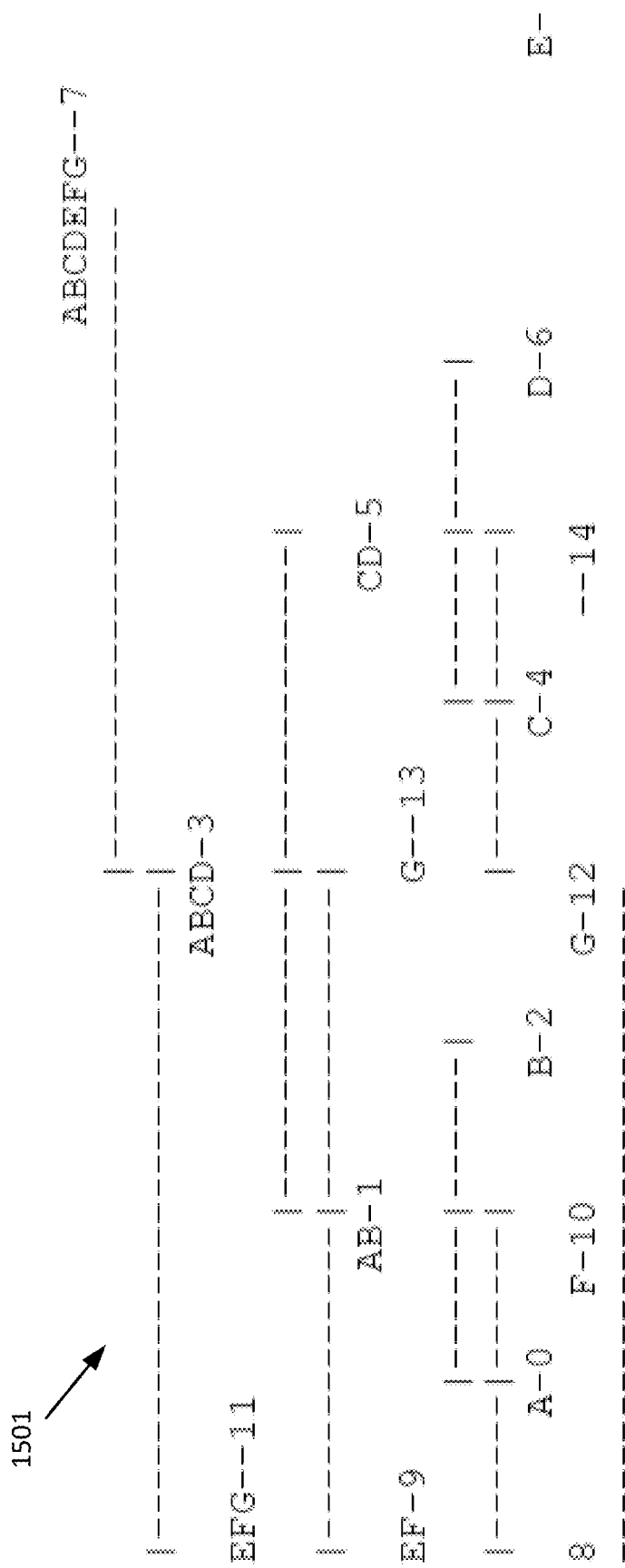
FIG. 15 depicts an example of a ratchet tree protocol that may be used in connection with the described system, according to one embodiment.

In at least one embodiment, the described system maintains security by implementing visibility into network communication via secure, scalable messaging groups based on a ratchet tree protocol so as to guarantee forward security as well as post-compromise security. A ratchet tree is a left-balanced binary tree. As each node is added into the tree, secrets for decryption (and other relevant information) are recalculated. Thus, each node can only see the secrets since it joined and not before. Additionally, if a node is misbehaving or fraudulent and needs to be removed from the tree, secrets can be recalculated so as to make it impossible for the node to view new communication within the group. Referring now to FIG. 15, there is shown an example of a ratchet tree protocol 1501 that may be used in connection with the described system, according to one embodiment. A ratchet tree is essentially a binary tree that allows for easy searching and fast retrieval. For example, the ratchet tree may hold the IP addresses of the network devices on the path or the tiers in a multi-tier network.

FIGS. 18 to 23 depict examples of a ratchet tree protocol, illustrating the fact that a network can have multiple paths, and each connection within the network may take a different path.

Figure 18:
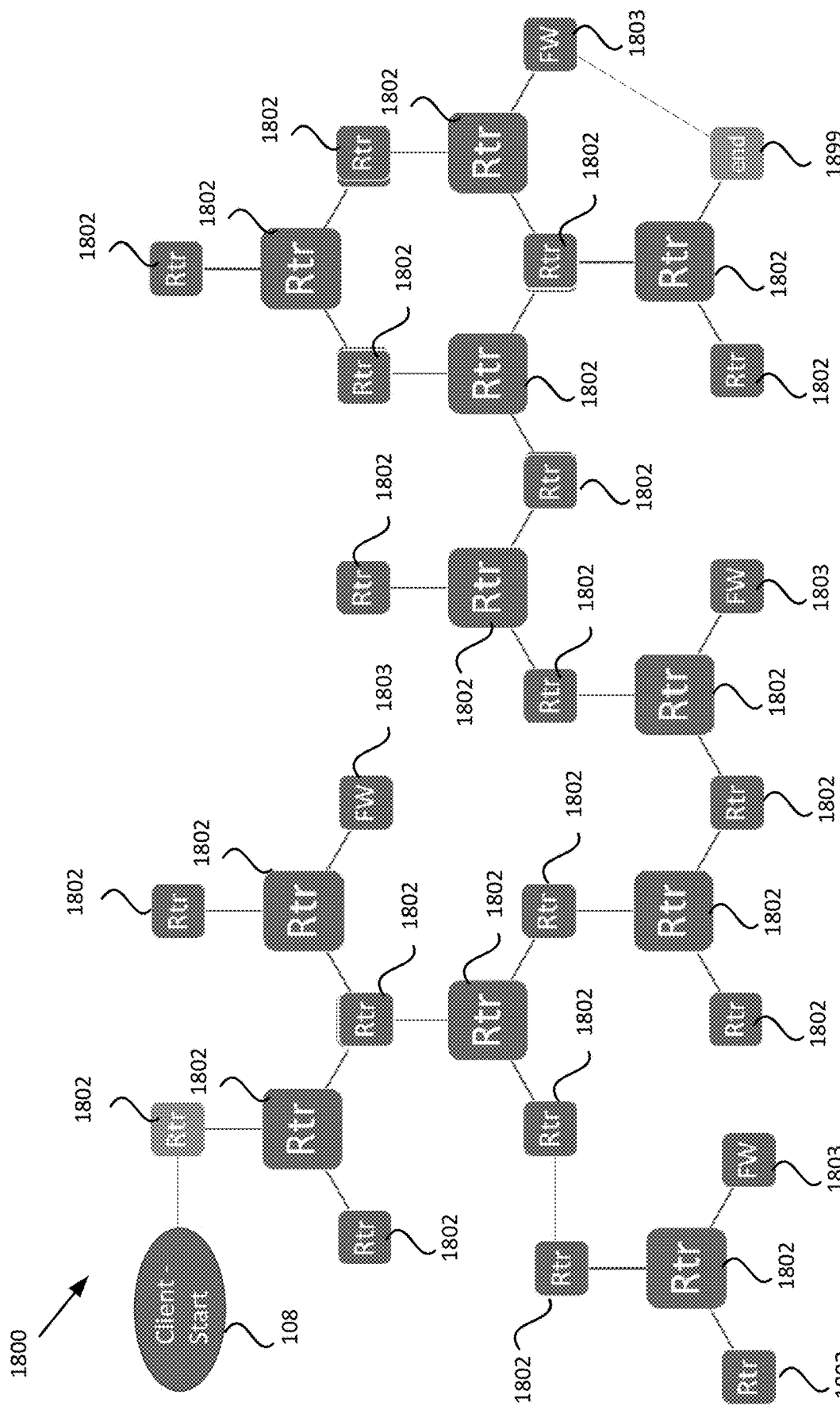
FIG. 18 depicts an example of a network with multiple paths.

Referring now to FIG. 18, there is shown an example of a network 1800 with multiple paths. A message beginning at client 108 has many different paths it can take on its way to end point 1899. Along the way it may traverse many different nodes, denoted in FIG. 18 as routers 1802 and firewalls 1803.

Ratchet tree 1800 shows the path actually taken; however, ratchet tree 1800 evolves as the connections are made. Referring now to FIGS. 19 through 23, there is shown a series of diagrams depicting the evolution of ratchet tree 1800.

Figure 19:
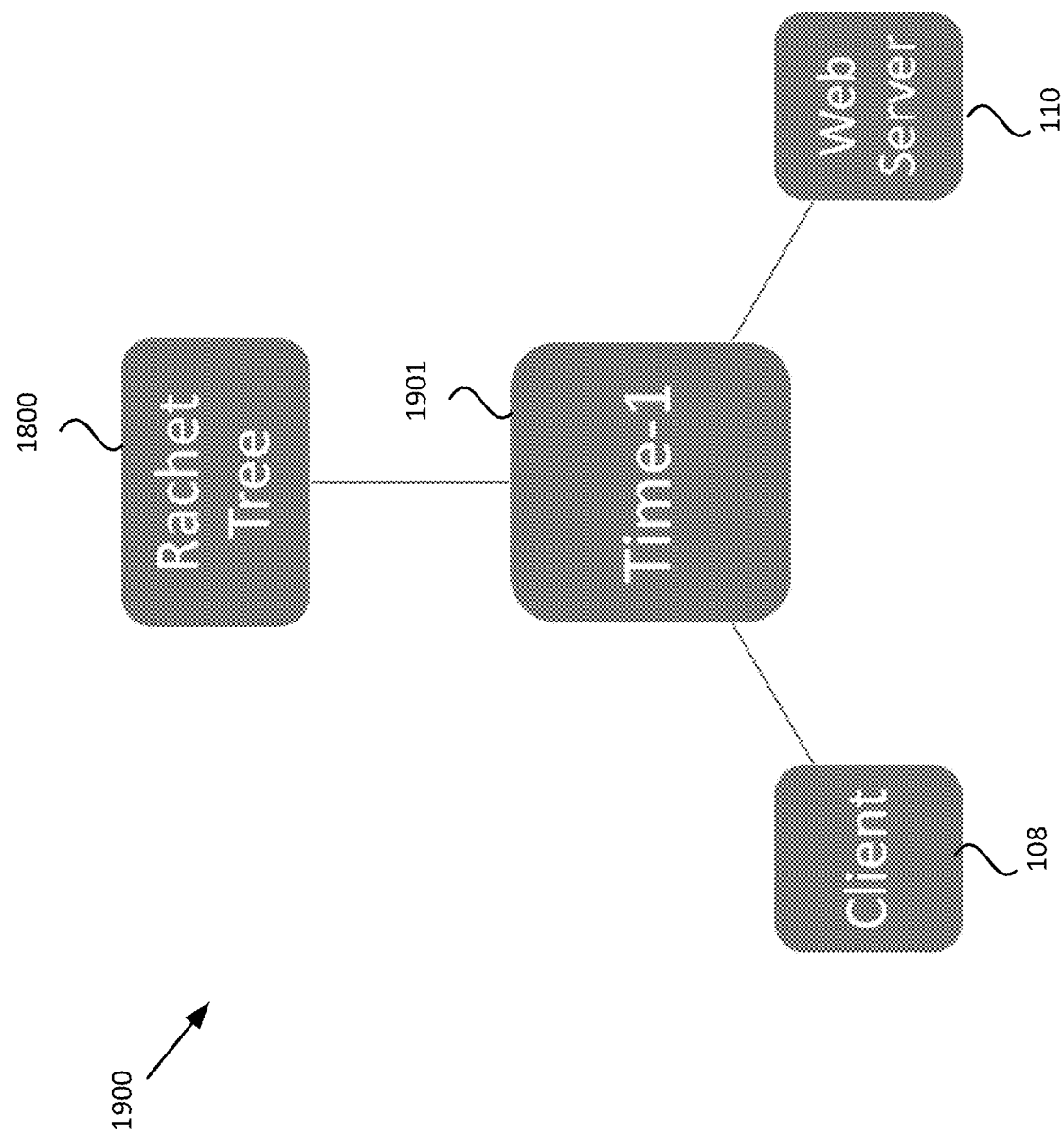
FIGS. 19 to 23 depict a series of diagrams depicting the evolution of a ratchet tree.

FIG. 19 depicts first iteration 1900 of ratchet tree 1800, wherein each device along the path has a leaf slot (the very bottom nodes of ratchet tree 1800). Here, client 108 and web server 110 are depicted as leaf nodes. Time-1 designator 1901 indicates that diagram 1900 depicts ratchet tree 1800 at time 1 (i.e., the first iteration), and shows the connection between client 108 and web server 110.

Figure 20:
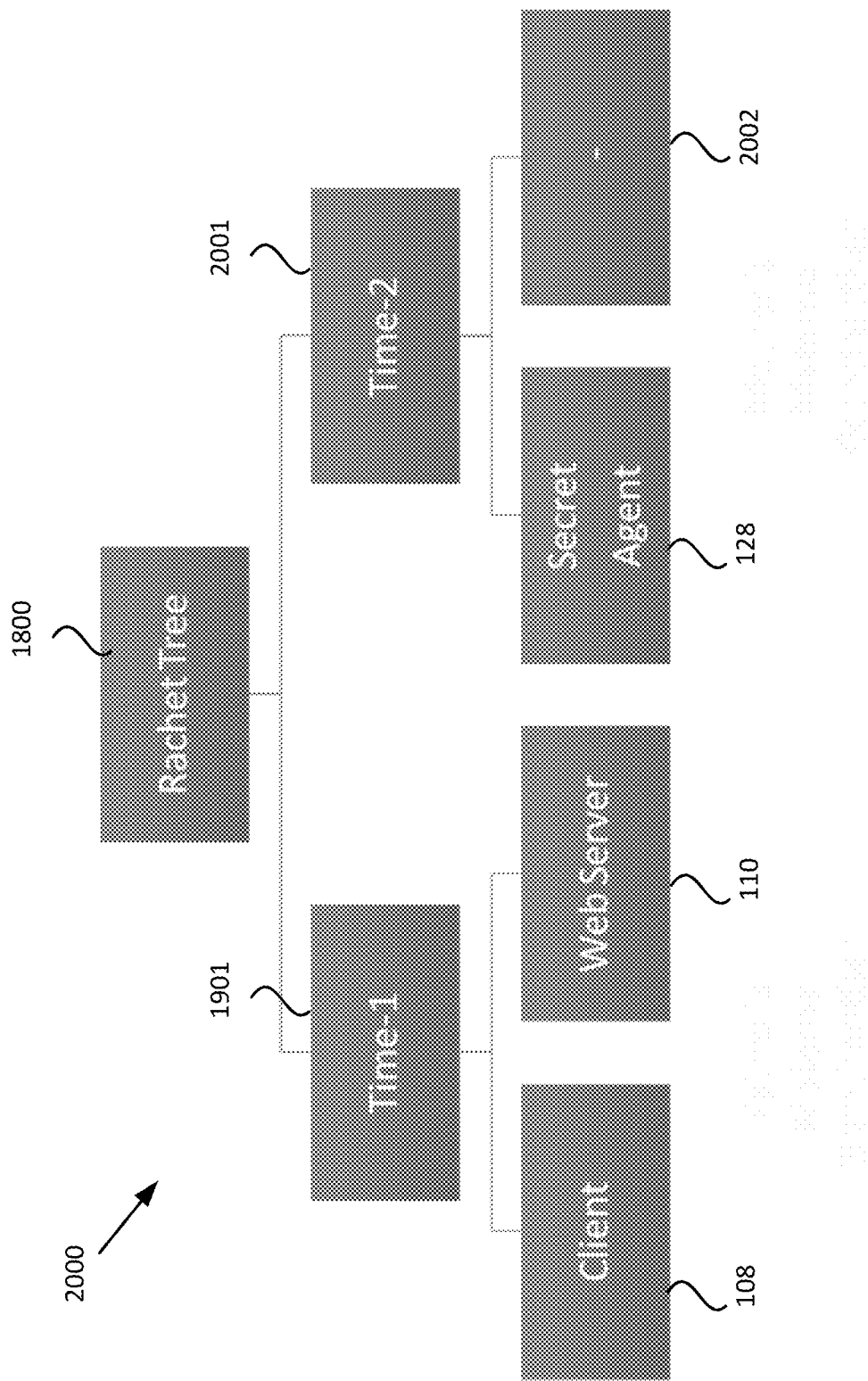

FIG. 20 depicts second iteration 2000 of ratchet tree 1800. Here, secret agent 128 is added. At this point, all nodes within tree 1800 are a part of the messaging group and have access to the group secrets. Node 2002 is currently undefined.

Figure 21:
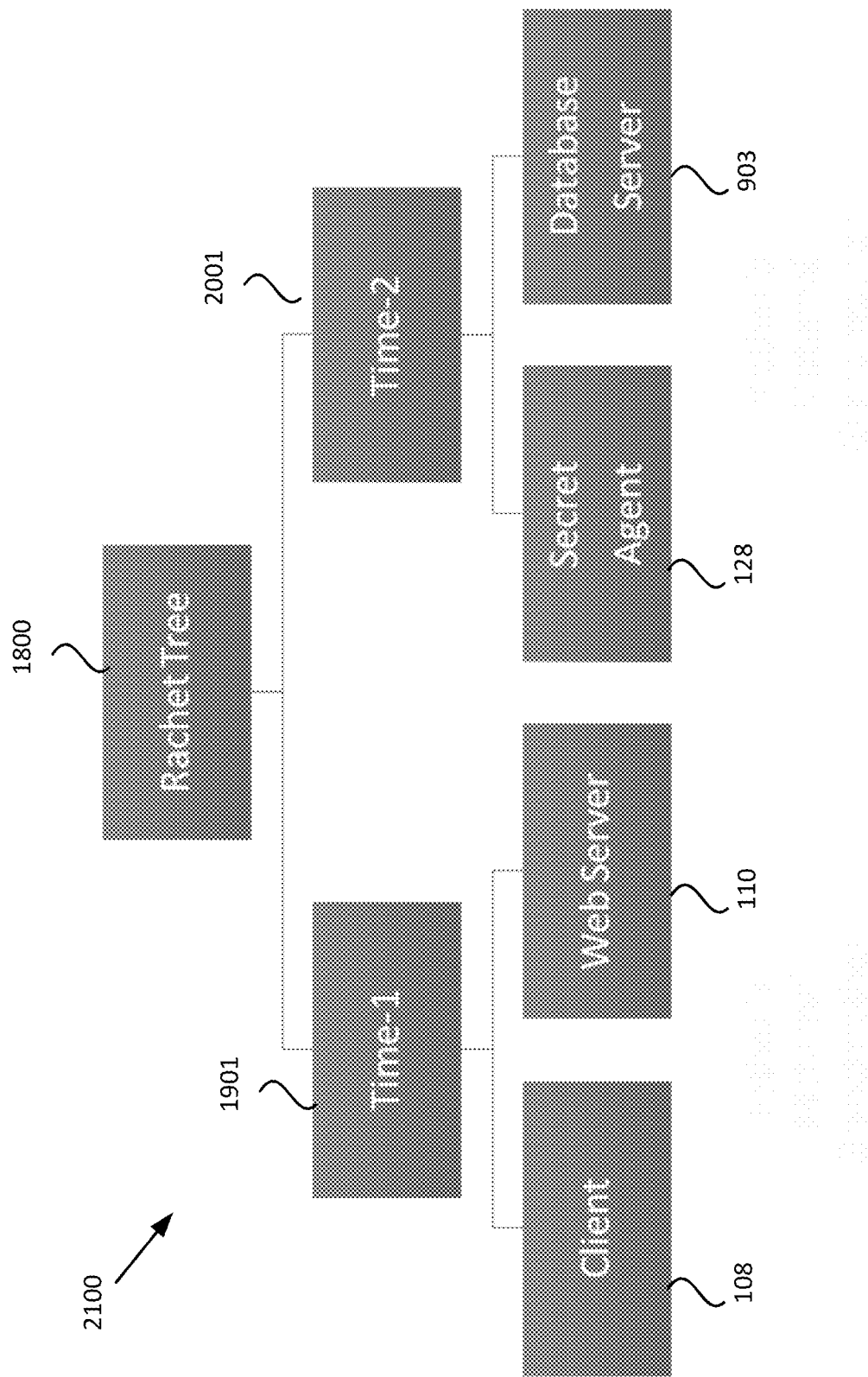

FIG. 21 depicts third iteration 2100 of ratchet tree 1800. Here, database server 903 is added, replacing previously undefined node 2002. Time-2 designator 2001 indicates the specific point in time at which nodes 128, 903 were added.

The paths in the network as well as the network devices can change dynamically, in particular for software-defined networks and/or networks that include virtualized devices, which can result in dynamic changes to networks. In such situations, being able to tell the path that a connection took and the devices connected is valuable information for a network diagnostician.

Figure 22:
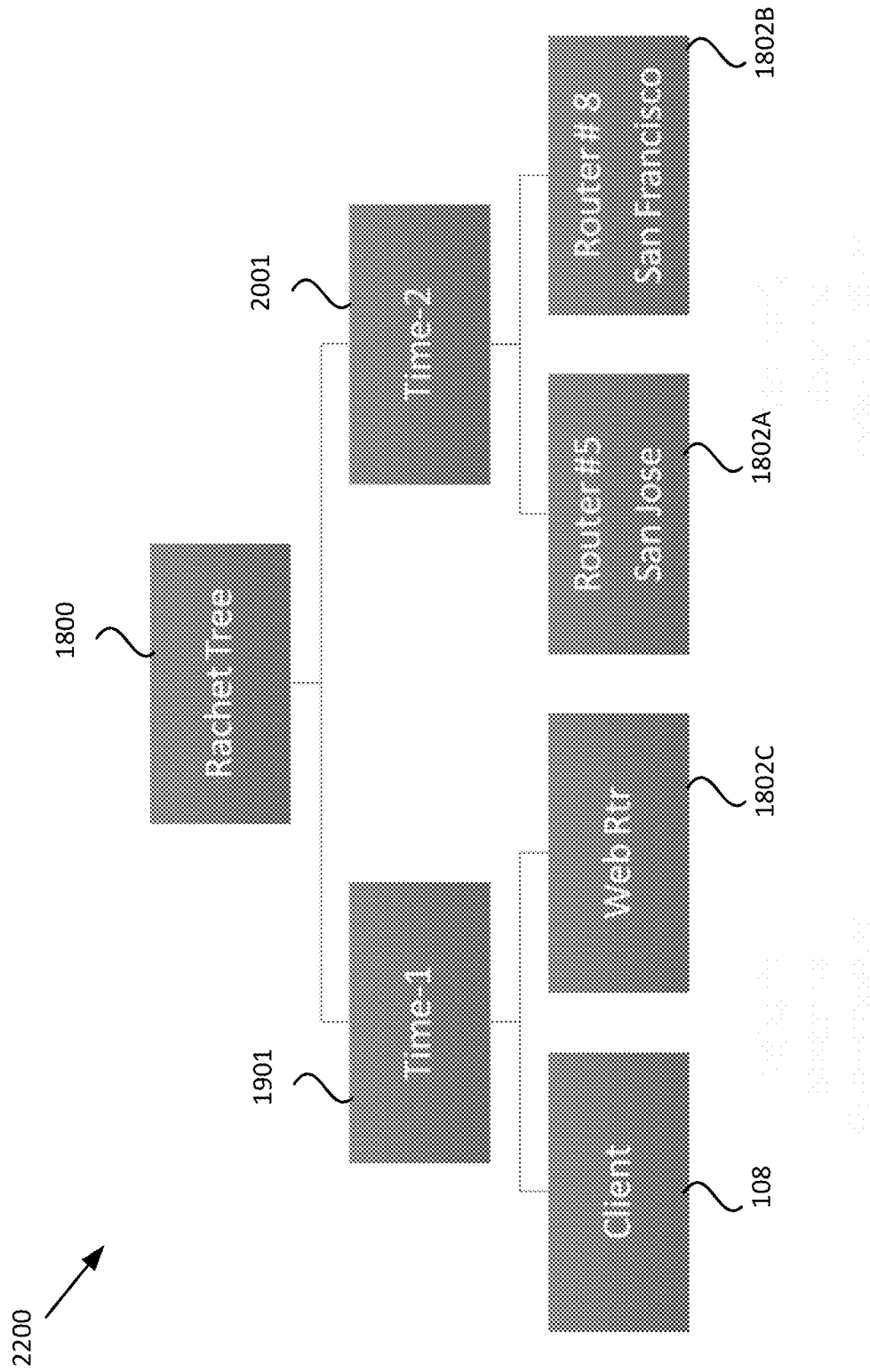

FIG. 22 depicts fourth iteration 2200, representing an alternative ratchet tree 1800 including routers 1802A, 1802B, 1802C (or IP addressable nodes) along the path. These may change dynamically if there are failures that cause an alternate or backup route to be used. The alternate route may have different performance characteristics, leading to slower performance. In addition, some alternate routes may use another transmission medium such as satellite, which can result in different performance implications. Again, merely seeing the path may highlight the problem even when the payload is not decrypted.

Figure 23:
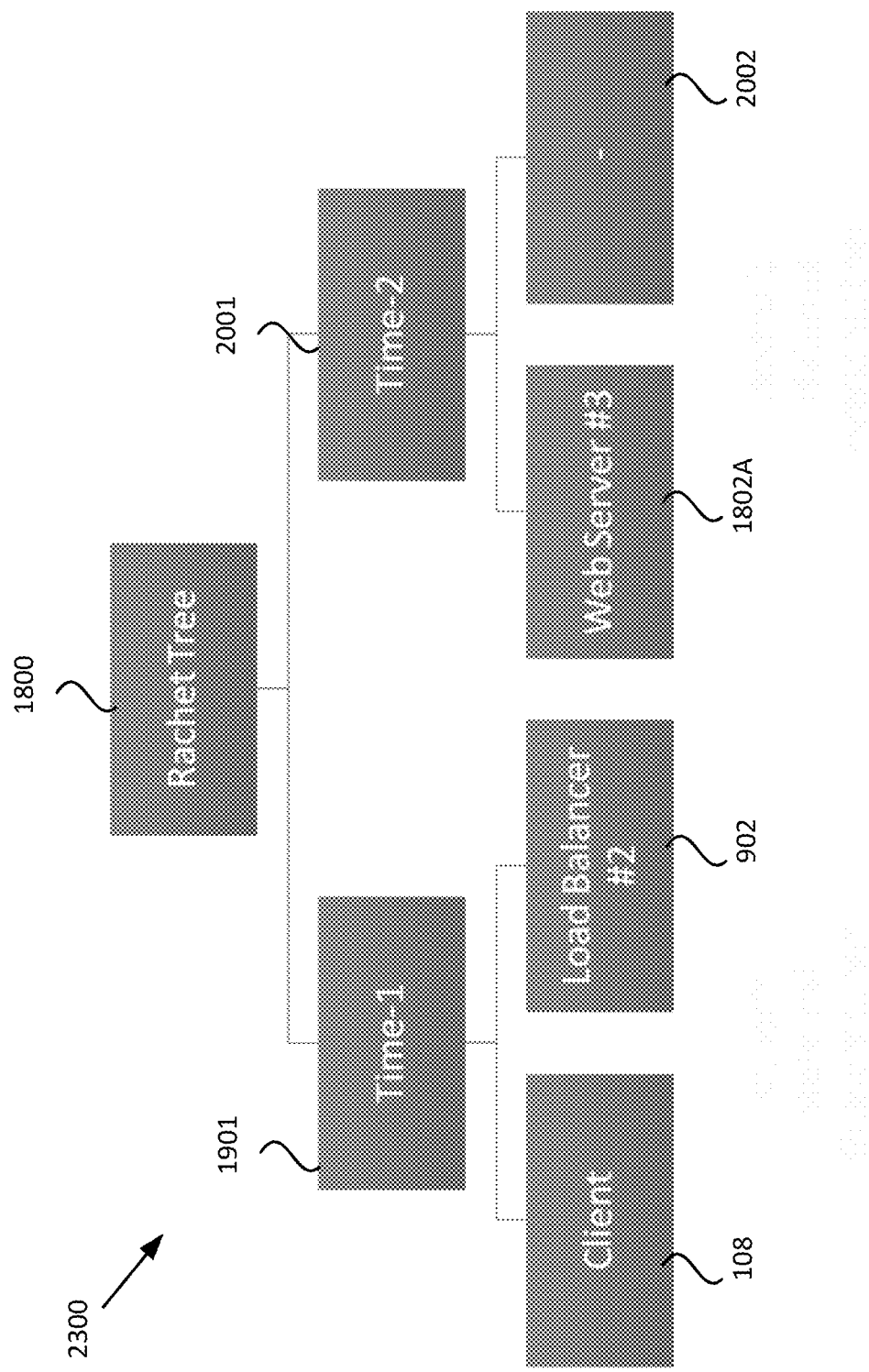

FIG. 23 depicts yet another iteration 2300, representing an alternative ratchet tree 1800 including middleboxes along the path, such as load balancers 902. Other types of middleboxes may include firewalls, database managers, and/or the like (not shown in FIG. 23). These will not have IP addresses thus will not be seen in using pure IP diagnostics such as a traceroute. Knowing which server is used behind a load balancer such as 902 can provide valuable diagnostic information even when the payload is not decrypted.

In at least one embodiment, the system is implemented using a Message Layer Security (MLS) protocol as defined by the Internet Engineering Task Force (IETF). One skilled in the art will recognize, however, that other protocols can be used. J. Hoyland, "An Analysis of TLS 1.3 and its use in Composite Protocols" (Information Security Group, Department of Mathematics, Royal Holloway, University of London: 2018) describes the use of MLS to distribute keys securely to two participants. In many modern network architectures, routes and even devices are dynamic. The evolution of Software Defined Networks, Infrastructure-as-a-Service, containers, and virtualization of nearly every component means that static networks are a historical relic. These advances, which may be implemented as cloud technologies, provide flexibility and scalability; however, they can also pose a challenge for security and problem diagnosis for both failures and performance degradation.

The system described herein reduces such concerns by providing a dynamic view of the path taken by any connection. Each network device along the path joins a messaging group, such as a WhatsApp group. A described above, the data obtained via the messaging group allows a network diagnostician to see which of the thousands of possible paths were actually taken when sending data along the path. Additionally, information known to one set of participants which may be crucial to understanding network delays and other issues can be securely saved.

As an example, a database server network device may store the name of a particular user, database and table name. Offline diagnostics may show that this particular table was very large in size and not indexed properly. The system thus provides a way to quickly solve a problem that otherwise might take much time to diagnose after the fact. This is only one example of value-added information that can be securely transmitted between participants according to the techniques described herein.

Keys for packet decryption are of primary interest in providing visibility. Yet this additional information which is securely kept which may lessen the need for visibility or packet decryption.

In at least one embodiment, the described system performs authentication via x-509 certificates. Authentication can also be improved and supplemented by using granular thumbprinting of the parties who are communicating. Such thumbprinting can include, for example, obtaining information about the characteristics of the device which are both relatively permanent and relatively transient. For example, the version and release of the Operating System (OS) as well as the chipset being used are likely to be relatively long-lived. The number and type of physical network interfaces as well as some of the static IP addresses and associated MAC addresses are likely to also be long-lived. On the other hand, IPv6 privacy addresses, for example, are likely to be quite transient—possibly changing with every session. MAC addresses may be randomized. Yet the combination of these characteristics is likely to provide a relatively unique identification of the particular device. In at least one embodiment, such thumbprinting can be combined with Multi-Factor Authentication (MFA) as well as other user provided security information for reasonably solid identity validation.

In at least one embodiment, mutual authentication is done in a registration step prior to actual communication. This provides additional control and guarantees that each party is communicating with the party or device that he or she intends to speak to. Such a technique also provides assurance to the other side of the communication that the party or device that initiated the communication is authorized to do so.

For example, using the techniques described herein, before a user can access a website via a device such as an iPhone, the server associated with the website is first pre-defined and authenticated. In at least one embodiment, such authentication may take the form of downloading a key package. Such a key package may contain, for example, thumbprint data for the device, describing various characteristics such as OS, type of device, number of interfaces, known L2 and L3 addresses, and/or the like.

Figure 14:
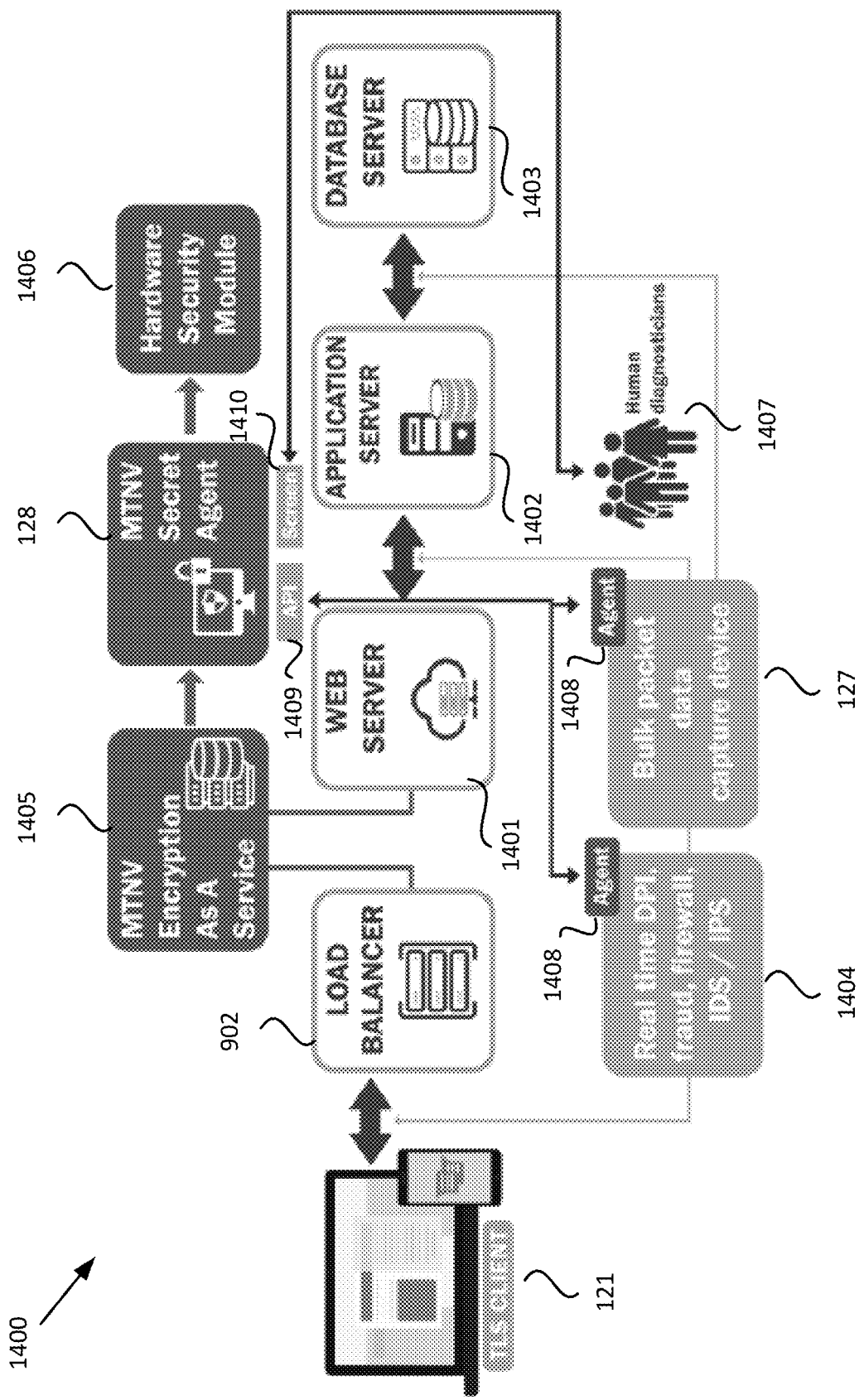
FIG. 14 is a block diagram depicting an overview of the system according to one embodiment, including a multi-tiered network visibility (MTNV) encryption as a service module installed between a load balancer and a web server.

Referring now to FIG. 14, there is shown a block diagram depicting an overview of system 1400 for implementing the described techniques according to one embodiment, including module 1405 for implementing multi-tiered network visibility (MTNV) encryption as a service, installed between load balancer 902 and web server 1401.

In at least one embodiment, module 1405 performs functions such as initiating and configuring a TLS session, setting up secure messaging groups, and any other steps needed to provide secure communications between TLS client 121 (which may be implemented on any electronic device such as client device 108 of FIG. 17) and other components, while also providing data visibility to authorized parties.

In at least one embodiment, a messaging group is formed. Module 1405 obtains a portion of a key and provides it to multi-tiered network visibility (MTNV) secret agent 128. The keys for the TLS session are not known to any devices on the messaging group other than TLS client 121 and web server 1401. Secret agent 128 stores the key portion it has in hardware security module (HSM) 1406, which may be implemented as a secure data store 106 associated with server 110 or other device. Web server 1401, application server 1402, and database server 1403 may be implemented using any known techniques, for example on one or more server(s) 110 as shown in FIG. 17.

In at least one embodiment, secret agent 128 is not a part of the messaging group. It does not have the entire key until later when it reconstructs the TLS session key. This prevents malicious parties from sending fraudulent messages via the TLS session itself. In particular, no other device (other than TLS client 121 and web server 1401) knows the keys during the session itself. If the enterprise authorizes the use after-the-fact, then the keys can be made securely available. Alternatively, if a real-time API is used wherein secret agent 128 is accessed as the session proceeds, for example, for a firewall that performs deep packet inspection or a device for fraud monitoring, then that device has the keys for the session. In enterprise networks, such devices may be prevented from injecting traffic into the network. That is, they may have only an ingress interface not an egress interface.

When the TLS session key is needed, secret agent 128 reconstructs the key and provides it to an authorized device. Alternatively, a human diagnostician 1407, may enter the key into a piece of software such as WireShark, which can decrypt the payload based on the key provided. In yet another embodiment, the key can be given to bulk data capture device 127 such as Gigamon which can provide decrypted data to multiple devices. In at least one embodiment, devices and human diagnostician 1407 are strictly authenticated.

In at least one embodiment, an application programming interface (API) 1409 is made available, to provide keys in real-time to authorized monitoring devices. In at least one embodiment, agent interfaces 1408 are provided for components such as real-time deep packet inspection (DPI) module, fraud, and/or firewall intrusion detection system (IDS)/intrusion protection system (IPS) 1404, as well as bulk data capture device 127.

System Architecture

Referring now to FIG. 1, there is shown a block diagram depicting a system architecture 100 according to one embodiment, for securely providing visibility along a communication path between client 121 (which may be a Messaging Layer Security (MLS) client, Transport Layer Security (TLS) client, or the like), and another party 123 (which may be a Messaging Layer Security (MLS) client, Transport Layer Security (TLS) server, or the like). Client 121 and/or other party 123 may be implemented on client device(s) 108 and/or server(s) 110 as depicted in FIG. 17. In at least one embodiment, such communication between components 121 and 123 takes place by transfer of encrypted packets 122 which, as described herein, may be visible in certain circumstances to authenticated parties.

In at least one embodiment, multi-factor authentication (MFA) and registration are performed by MLS authentication server (AS) 124. In at least one embodiment, the authentication server includes database 301A. Authentication server (AS) 124 signs a credential for client 121. In at least one embodiment, authentication server 124 performs this step by creating and providing an authentication server signature public key, referred to as an AS signing key. Once this has taken place, authentication server 124 is no longer needed for the remainder of the communication. In various embodiments, authentication server 124 may also contain code for performing functions such as handling of topology, logging, detection of fraudulent activity, and/or multi-factor authentication (MFA). In some embodiments, more than one authentication server 124 may be provided. In such an architecture, one authentication server 124 may also sign public keys for other authentication servers 124 in the system. Thus, the client of any one authentication server 124 can trust the signed public key of any other authentication server 124 as the other authentication server's 124 public key has been signed by its own authentication server 124, which it trusts.

MLS delivery/directory server 125 may also be provided, and may be implemented at server(s) 110. In at least one embodiment, MLS-TLS proxy code can be provided at the MLS delivery/directory server 125 for creating groups and proxying TLS sessions.

MLS delivery/directory server 125 is used for storage and retrieval of a key package, and in at least one embodiment includes database 301B. In at least one embodiment, MLS delivery/directory server 125 is implemented as part of a delivery server according to an MLS specification.

Figure 4:
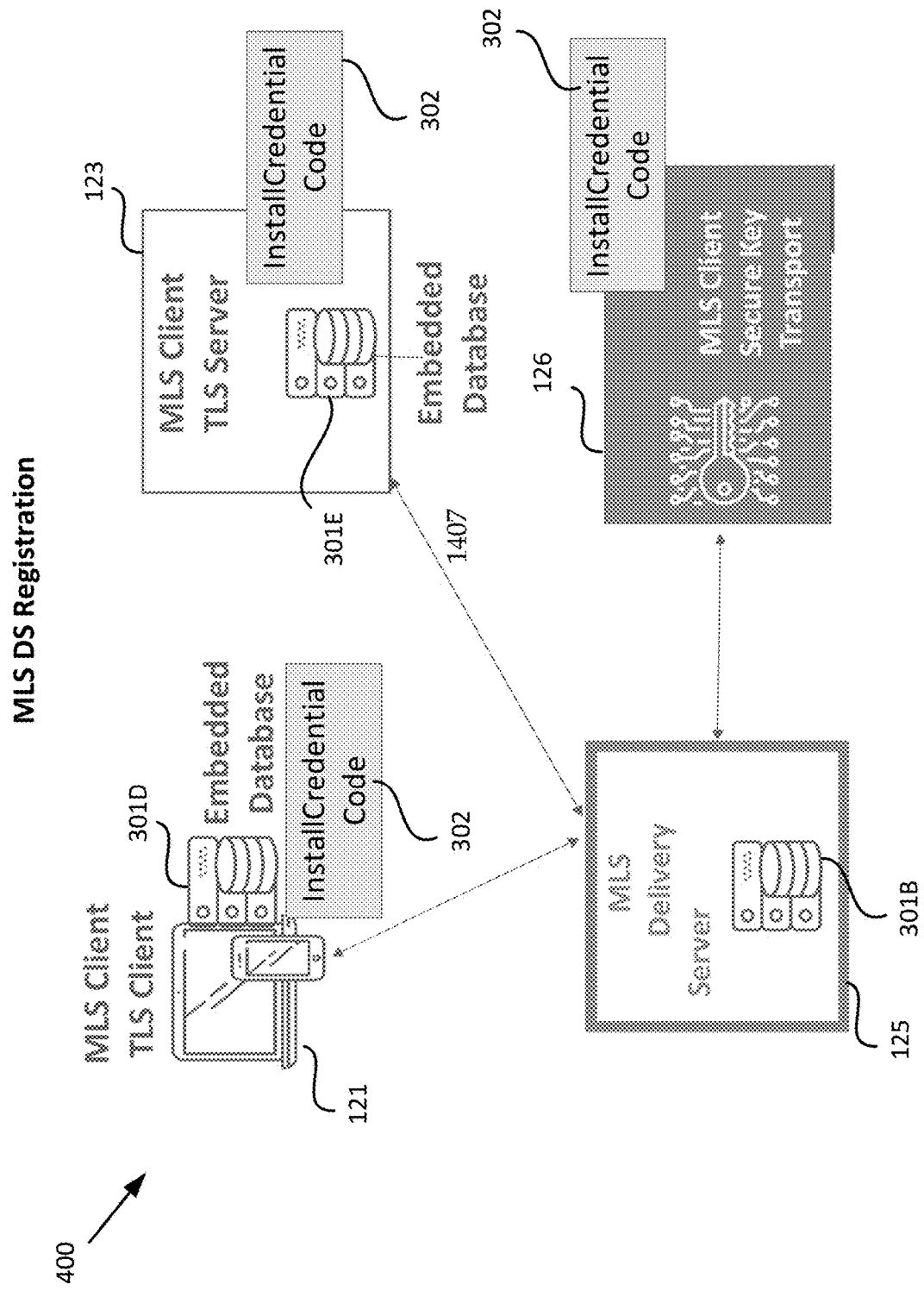
FIG. 4 is a block diagram depicting MLS Delivery Server (DS) registration, according to one embodiment.

In at least one embodiment, as shown in FIG. 4, the system includes, within various components, embedded client database(s) 301 that store(s) private keys, group context, and/or a ratchet tree. In addition, client code can be provided at each client 121 and/or other components for performing the following functions:

InstallCredential code 302: creates private keys (such as an initial key package), credentials, and/or other identifying information MLS-TLS-Proxy: creates group and initiates proxying of TLS sessions (in connection with server-based code as described above)

Referring again to FIG. 1, the system may also include bulk data capture device 127, which captures encrypted packets 122 as they travel along the communication path between components 121 and 123. Secret agent 128 (or another authorized party) can gain access to data captured by bulk data capture device 127, but only if authenticated. In at least one embodiment, MLS client secure key transport module 126 facilitates such authentication by communicating with authentication server 124 and/or delivery/directory server 125.

Delivery/directory server 125 is the main component entrusted with delivery of messages to each participant. Such messages may be of any type, such as for example handshake or protocol messages concerned with the creation of the group, keys, or other group maintenance functions, or communications from one participant to another. An example of communication from one participant to another may be to indicate which database table or virtual host is being used.

Although the system is described herein in connection with MLS and TLS components, one skilled in the art will recognize that other protocols can be used, such as for example Secure Shell Protocol (SSH), blockchain, or the like.

In at least one embodiment, the system operates by wrapping communications between the various components within a messaging group, such as for example a WhatsApp group, as described in more detail below. By using the secure messaging group as a communications channel, a secure, authenticated mechanism is provided to enable visibility into packets 122 as they travel along the communication path.

As described herein, authentication server 124 and delivery/directory server 125 work together to securely initiate and maintain the messaging group. In addition, as indicated above, thumbprinting can be used as an additional authentication mechanism based on specific characteristics of devices along the path.

DESCRIPTION OF COMPONENTS

Referring again to FIG. 1, the following is a description of components that may be used in implementing the system described herein.

- MLS/TLS e-client 121: In at least one embodiment, this is an enterprise TLS client with MLS support. It can be on an enterprise network or on the Internet. To enable use of MLS-TLS with a pre-shared key (PSK), a browser plug-in may be used. Alternatively, any other suitable way to establish and control the encryption may be used.
- MLS/TLS e-server 123: In at least one embodiment, this is an enterprise TLS server with MLS support. It can be on the enterprise network or on the Internet (cloud). In at least one embodiment, it is on premises at a data center. To enable use of MLS-TLS with a PSK, in at least one embodiment, a modification is made to allow control of the encryption.
- Bulk data capture device 127: This may be a device owned by the enterprise, configured to capture all packets 122 on the network, including TLS handshake and/or other packets. In particular, device 127 may be configured to provide authorization to extract handshake packets as needed. In at least one embodiment, device 127 performs packet decryption and passes the result to other components and/or individuals; an API may be made available to perform this operation. In at least one embodiment, device 127 may be, for example, a device available from Gigamon of Santa Clara, California
- MLS authentication server (AS) 124: This is used for authentication in the MLS portion. Authentication server 124 maps identities to keys.
- MLS delivery/directory server 125: This is used for delivering messages, starting groups, and downloading key information. Server 125 may include, for example, a message delivery server and a directory server. Server 125 may use keys to find a key package (e.g., InitKey) to add a client to a group.
- MLS client secure key transport module 126: This component participates in the MLS group with client 121 and server 123. In at least one embodiment, module 126 does not participate in the TLS handshake and does not see the packets. It participates just long enough to be a part of the MLS group and to be able to decrypt the MLS messages sent by client 121 and server 123, and does not necessarily have the full pre-shared key (PSK), which may be derived by secret agent 128. For example, a human resources department may not want Janitorial Services to access to PSKs for their department. Secure key transport module 126 does not know the real PSK; it is only able to participate in MLS exchanges. In at least one embodiment, multiple secure key transport modules 126 may be provided.
- Secret agent 128: This secure component connects to module 126 and device 127. In at least one embodiment, it does not participate in the original MLS group or the original TLS connection. It combines the portion of the PSK sent by the module 126 with the key packages for the MLS group participants and the transcript hash of a portion of the ClientHello from bulk data capture device 127 to recompute the PSK. It also derives the secrets needed to decrypt the TLS handshake and application data. In at least one embodiment, secret agent 128 may be implemented as a component of hardware security module (HSM) 1406 (shown in FIG. 14), or as an appliance with an HSM card, or as another separate, very secure device requiring high authentication. In at least one embodiment, multiple secret agents 128 may be used.

Connections Among Components

The following is a description of various connections that can be established among the above-described components, in order to implement the functionality described herein.

Configuration information for such connections may be entered through any suitable mechanisms, such as for example firewall settings, internal configuration, DNS-SD, and/or the like.

MLS/TLS e-Client 121
- Connections initiated by others: None
- Connections initiated by self:
  - Connects to MLS-AS 124 and MLS-DS 125 to store keys and authentication information
  - Initiates starting a group with MLS/TLS e-server 123 via MLS-DS 125
  - Initiates starting a TLS session with MLS/TLS e-server 123 using TLS-PSK
- Connections not allowed
  - No direct connection to secure key transport module 126 or secret agent 128

MLS/TLS e-Server 123
- Connections initiated by others:
  - Connection from MLS-DS 125 on behalf of MLS/TLS e-client 121 to join MLS group
  - Connection from TLS portion of MLS/TLS e-client 121 to establish TLS session
- Connections initiated by self:
  - Connects to MLS-AS 124 and MLS-DS 125 to store keys and authentication information
  - Initiates adding secure key transport module 126 to MLS group via MLS-DS 125
- Connections not allowed
  - No direct connection to secure key transport module 126 or secret agent 128

Bulk Data Capture Device 127
- Connections initiated by others:
  - Connection from secret agent 128 to obtain ClientHello
  - Connections from inline or out-of-band devices to obtain decrypted packets
- Connections initiated by self:
  - Connection to secret agent 128 to obtain secrets MLS Authentication Server 124
- Connections initiated by others:

Connections from MLS/TLS e-server 123, MLS/TLS e-client 121, secure key transport module 126, and secret agent 128 to store identity information and to obtain signature keys Connections initiated by self: None MLS Delivery/Directory Server 125

Connections initiated by others:

Connections from MLS/TLS e-server 123, MLS/TLS e-client 121, secure key transport module 126, and secret agent 128 to download key packages, start a group, or add members Connections initiated by self: None MLS Client Secure Key Transport Module 126

Connections initiated by others:

Connection by MLS-DS 125 on behalf of MLS/TLS e-server 123 to join MLS group Connections initiated by self:

Connects to MLS-AS 124 and MLS-DS 125 to store keys and authentication information Connection to secret agent 128 to send a portion of the PSK and other session-related information Connections not allowed In at least one embodiment, for security, this device is not able to connect to anything else, nor to join the network and/or send unsolicited packets Secret Agent 128

Connections initiated by others (tightly controlled):

Connections from secure key transport module 126 to pass data from MLS-TLS-PSK session Connections from bulk data capture device 127 to request secrets Connections from other inline or outbound devices to request secrets if bulk data capture device 127 does not perform the decryption Manual connection for out-of-band troubleshooting (such as, for example, Wireshark).

Connections initiated by self:

Connection to bulk data capture device 127 to fetch TLS clientHello

Connection to MLS-AS 124 to register

Connection to MLS-DS 125 to download key packages

Figure 13A:
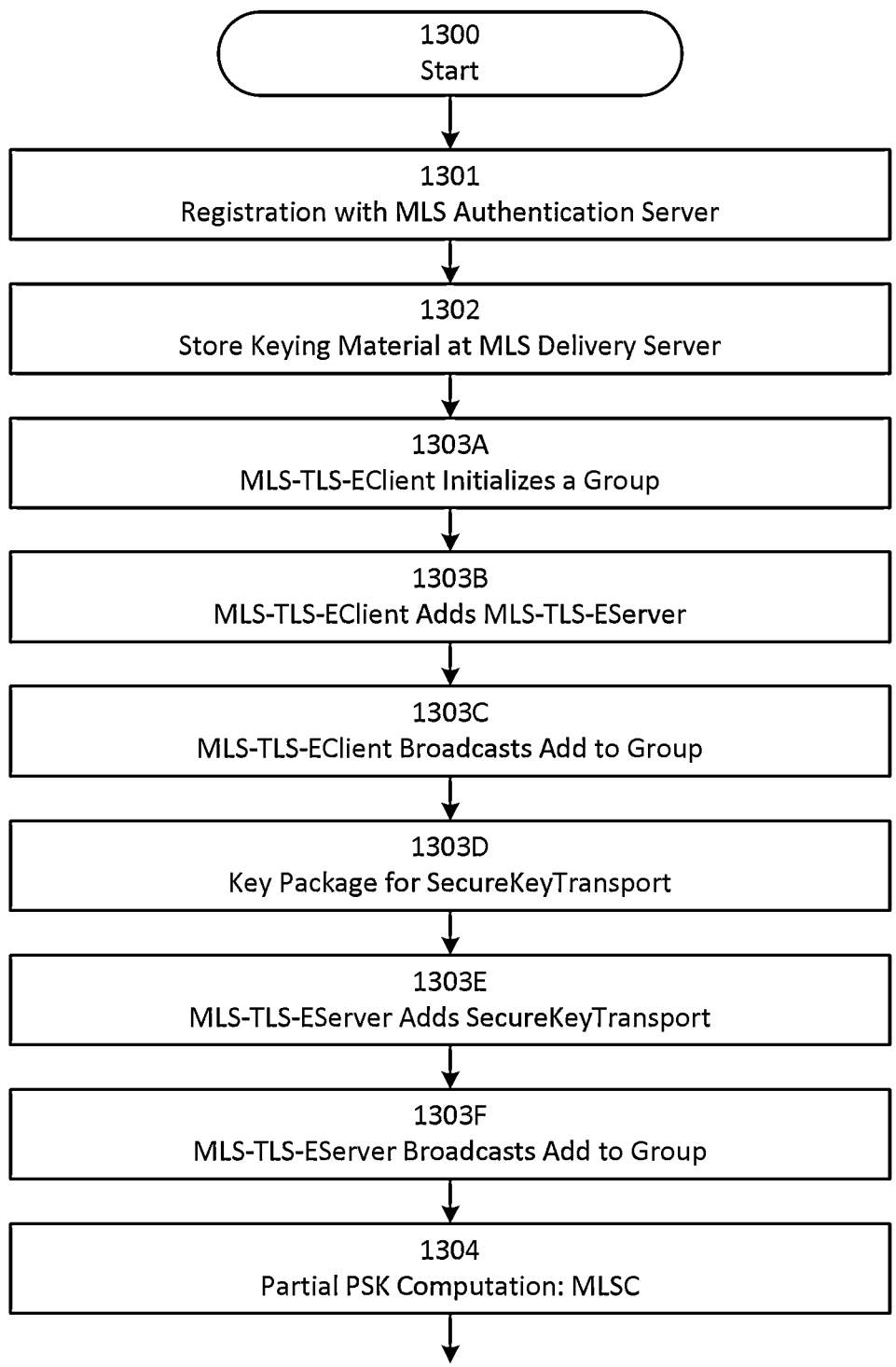
FIGS. 13A and 13B are a flowchart depicting an overall protocol flow for implementing the techniques described herein, according to one embodiment.
Figure 13B:
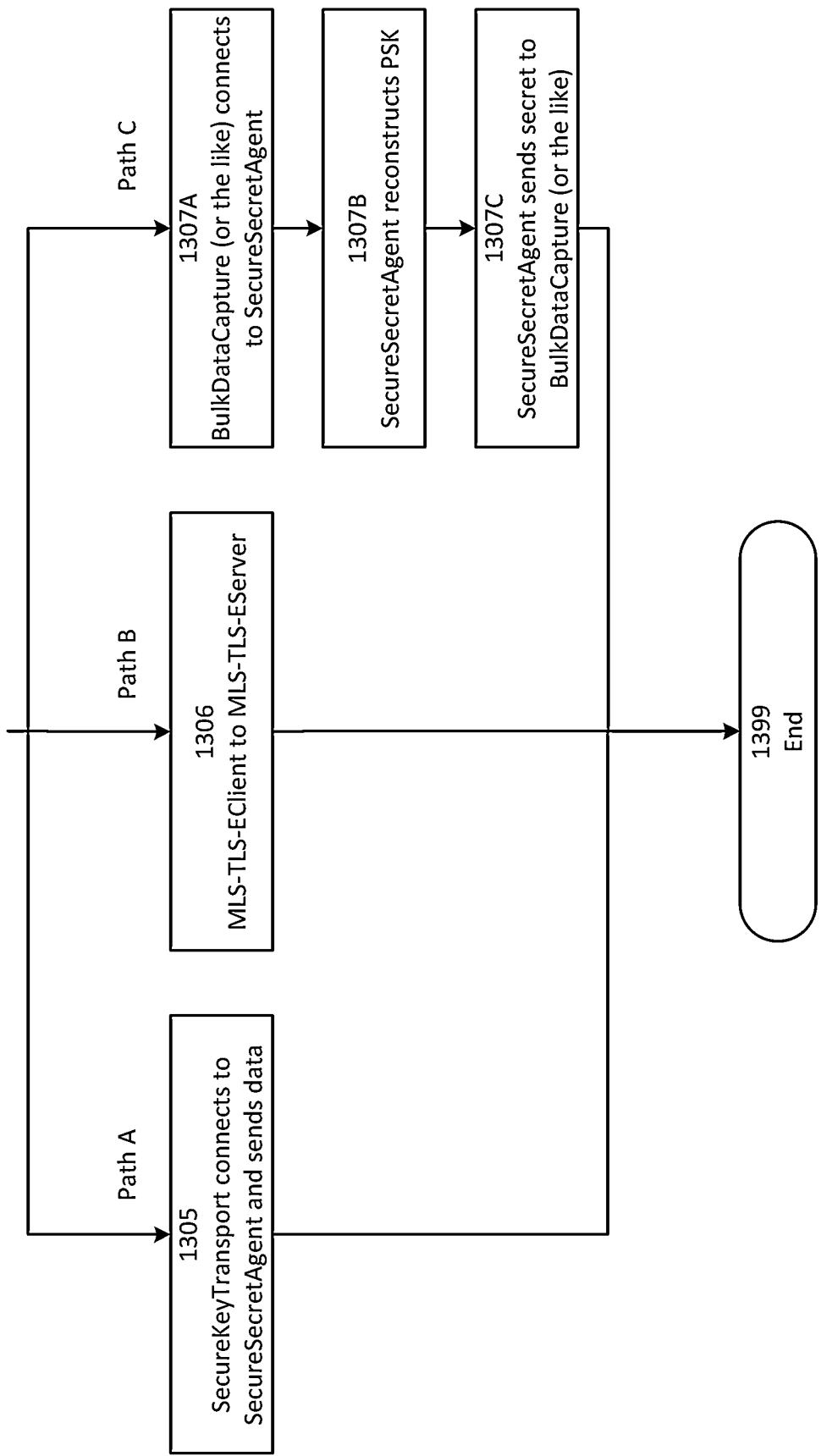

Connections not allowed:

In at least one embodiment, for security, secret agent 128 is not able to connect to anything else, nor to join the network and/or send unsolicited packets Method Overall Flow Referring now to FIGS. 13A and 13B, there is shown a flowchart depicting an overall protocol flow for implementing the techniques described herein, according to one embodiment, as follows:

In step 1300, the method begins.

In step 1301, registration with MLS authentication server 124 takes place. Secure key transport module 126, MLS/TLS e-server 123, and MLS/TLS e-client 121 enroll in MLS authentication server 124, creating MLS credentials and registering for the application. For added security, multi-factor authentication is used. Each client 121 may include any number of physical devices.

In step 1302, keying material is stored at MLS delivery/directory server 125. Secure key transport module 126, MLS/TLS e-server 123, and MLS/TLS e-client 121 submit, over a TLS authenticated connection, the MLS credentials and multiple MLS InitKeys for potential multiple groups.

In step 1303A, MLS/TLS e-client 121 initializes a group. MLS/TLS e-client 121 downloads a MLS key package for MLS/TLS e-server 123 from MLS delivery/directory server 125 by sending a GetClientInitKey command. MLS-DS 125 sends a key package for MLS/TLS e-server 123. MLS/TLS e-client 121 then creates a one-person group. It contains identity, credentials, and group ID.

In step 1303B, MLS/TLS e-client 121 adds MLS/TLS e-server 123. MLS/TLS e-client 121 uses MLS/TLS e-server's 123 key to send MLS/TLS e-server 123 a Welcome message (via the MLS delivery service). The Welcome message includes the current group state.

In step 1303C, MLS/TLS e-client 121 broadcasts an Add to Group message (via the MLS delivery service) to the group indicating that MLS/TLS e-server 123 is now added. Both compute the new group state.

In step 1303D, MLS/TLS e-server 123 downloads an MLS key package for secure key transport module 126 from MLS Delivery Server. MLS/TLS e-server 123 is preconfigured to know which secure key transport module 126 device to use. MLS-TLS e-server 123 sends the MLS GetClientInitKey command. MLS delivery/directory server 125 sends the key package to secure key transport module 126.

In step 1303E, MLS/TLS e-server 123 adds secure key transport module 126. MLS/TLS e-server 123 uses secure key transport module 126 key to send secure key transport module 126 a Welcome message (via the MLS delivery service). The Welcome message includes the current group state.

In step 1303F, MLS/TLS e-server 123 broadcasts an Add to Group message (via the MLS delivery service) to the group indicating that secure key transport module 126 is now added. MLS/TLS e-client 121, MLS/TLS e-server 123, and secure key transport module 126 compute the new group state. MLS/TLS e-client 121 is now aware that there is a third party in the group. There is also a shared group state and shared group key.

In step 1304, a portion of the PSK can be computed by all parties, as described in more detail below. In at least one embodiment, the PSK takes the form:

- < group id; HMAC(clientKeyPackage); HMAC(serverKeyPackage);
- HMAC(SecureKeyTransportKeyPackage); channel binding>
- where the channel binding is: (cipher key for encryption = MLS group Secret)
- HMAC(<Truncate(ClientHello); TLSClientSourceIP; TLSServerSourceIP; TLSClientPort; TLSServerPort >)

After step 1304, several paths can be performed in parallel or at any other suitable time. In path A, secure key transport module 126 establishes a TLS session with secret agent 128. In path B, MLS/TLS e-client 121 MLS/TLS e-server 123 proceed to establish a TLS session. In path C, various pre-processing steps may be performed.

Each of the paths will be described in turn.

Path A: In step 1305, secure key transport module 126 connects to secret agent 128 and sends data. Over a TLS session between secure key transport module 126 and secret agent 128, the following may be sent:

Public portion of the key packages for the MLS/TLS e-client 121, MLS/TLS e-server 123, and Secure key transport module 126

Identities of the MLS/TLS e-client 121, MLS/TLS e-server 123, and Secure key transport module 126

Group ID

Group secret (encryption key)

IP addresses and ports for MLS/TLS e-client 121 and MLS/TLS e-server 123 (to match with the ClientHello)

Path B: In step 1306, MLS/TLS e-client 121 establishes a TLS session with MLS/TLS e-server 123 and sends a ClientHello with the PSK that it has constructed. MLS/TLS e-server 123 responds with a ServerHello (PSK mode).

Path C: In step 1307A, bulk data capture device 127 (or the like) connects to secret agent 128. Later, when packet decryption is needed, bulk data capture device 127 (or the like) establishes a secure session with secret agent 128. As mentioned above, secret agent 128 may be implemented as hardware security module (HSM) 1406, as depicted in FIG. 14, or as an appliance with an HSM card, or as some other very secure device requiring high authentication. The input may be the IP address of the device, time range, and/or other filtering criteria.

In step 1307B, secret agent 128 reconstructs PSK. Secret agent 128 finds the information and session(s) stored for the IP address desired (stored previously by communication with secure key transport module 126). Secret agent 128 establishes a connection with bulk data capture device 127, downloads the ClientHello, truncates it, and creates a Hash-based message authentication code (HMAC) for the ClientHello. The PSK is reconstructed.

In step 1307C, secret agent 128 sends secret to bulk data capture device 127 (or the like). Secret agent 128 does the calculation of the secret needed for decryption using the PSK. The secret is sent to bulk data capture device 127 (or the like).

The method then ends 1399.

MTNV Initiation

Figure 2:
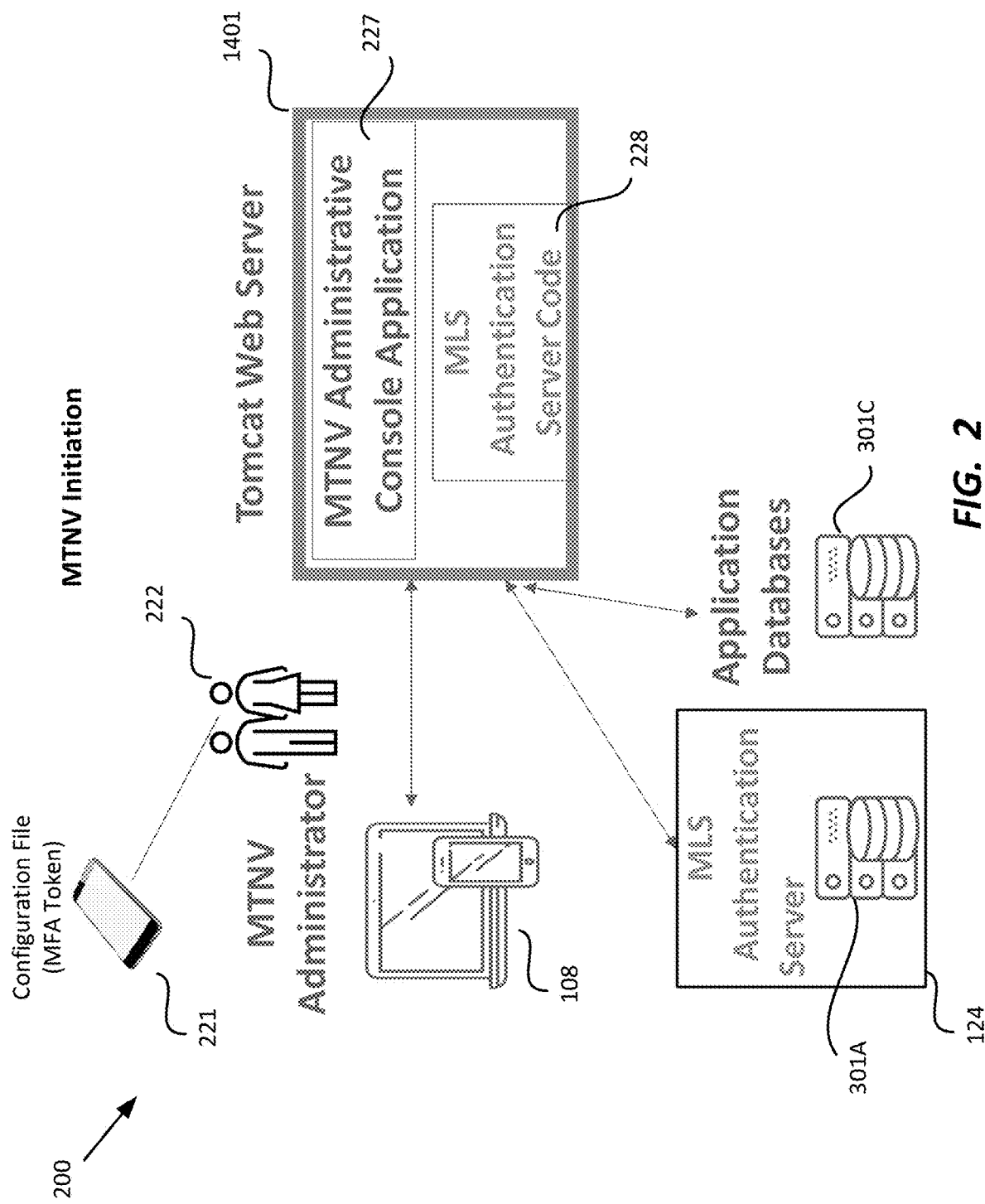
FIG. 2 is a block diagram depicting multi-tiered network visibility (MTNV) initiation and registration, according to one embodiment.

Referring now to FIG. 2, there is shown a block diagram depicting initial process 200, in which multi-tiered network visibility (MTNV) is initiated, and registration with an MTNV application is performed. In at least one embodiment, initial process 200 is performed any time a new TLS client 121 or TLS server 123 is to participate in MTNV, as follows:

- MTNV administrator (human) 222 logs on, via client device 108 (such as a computer or cell phone), to web application 227 called "MTNV Administrative Console" running on web server 1401, which registers TLS client 121 or TLS server 123 with authentication server (AS) 124. Relevant data is stored in MLS AS database 301A and/or application database(s) 301C. Web server 1401 may be, for example, a Tomcat web server.
- Multi-factor authentication (MFA) is performed, to authenticate the administrator using MLS AS code 228. The token is sent to client device 108 and verified.
- Initial setup is performed on AS database 301A for the new MLS client (TLS client 121 or TLS server 123).
- A configuration file, or MFA token 221, is created and installed on the new MLS client. Further steps in AS registration are performed as described below, in connection with FIG. 3.
- In at least one embodiment, secret agent 128 goes through a similar process.
- Configuration files are created by the MTNV application. These may be stored in application database(s) 301C.

In at least one embodiment, process 200 depicted in FIG. 2 employs the following socket connections:
- Admin client device 108 to web server 1401
- Web server 1401 to AS database 301A
- Web server 1401 to MTNV application database(s) 301C

MLS AS Registration

Figure 3:
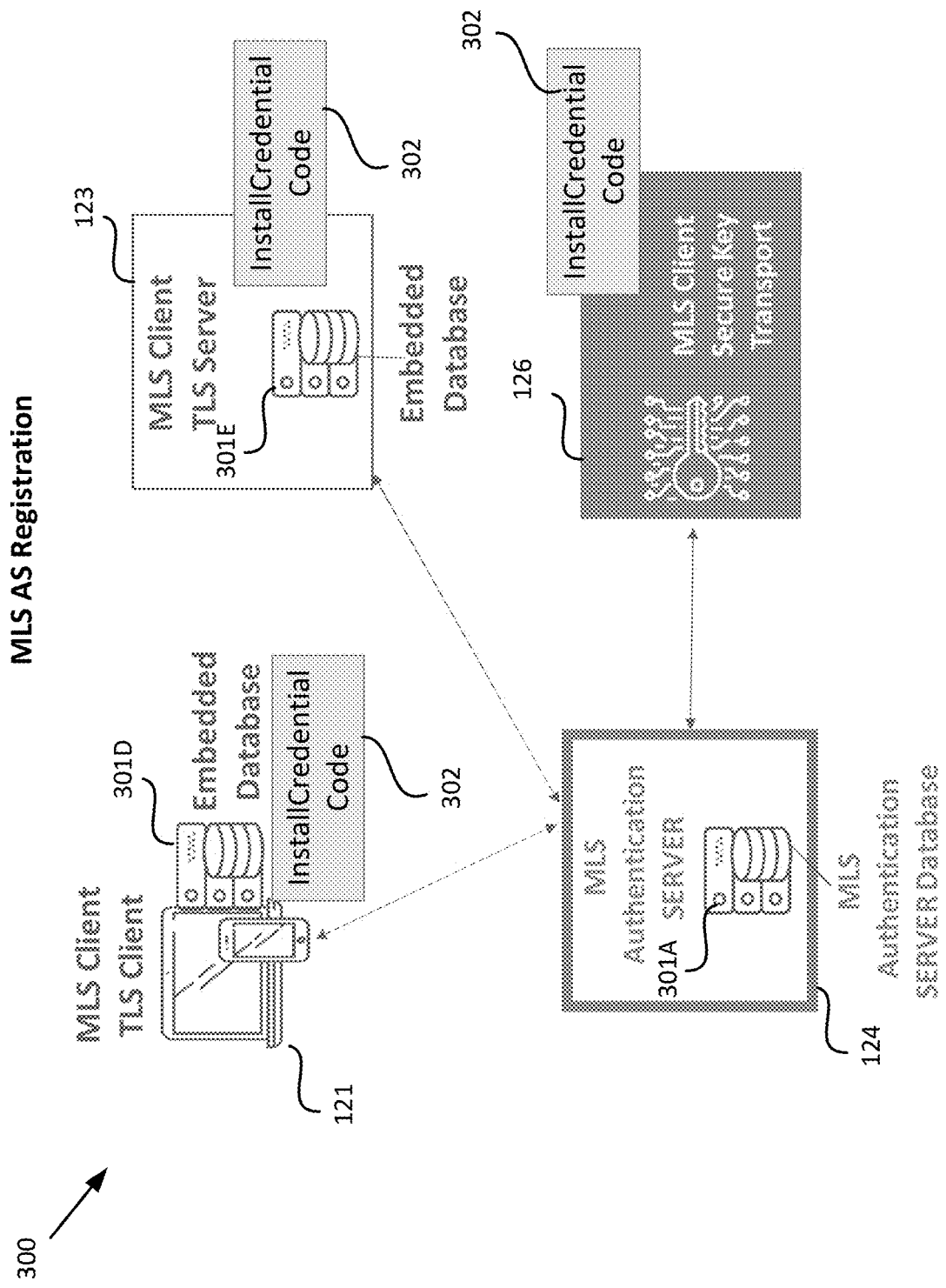
FIG. 3 is a block diagram depicting Messaging Layer Security (MLS) Authentication Server (AS) registration, according to one embodiment.

Referring now to FIG. 3, there is shown a block diagram depicting process 300, in which registration with MLS AS 124 is performed. In at least one embodiment, this process is performed following successful multi-factor authentication (MFA) as depicted in connection with FIG. 2. The process includes the following steps:
- InstallCredential code 302 is installed on each MLS client 121, 123.
- Configuration file (MFA token) 221 created in process 200 of FIG. 2 is placed on each MLS client 121.
- InstallCredential code 302 creates private keys, creates an MLS identity, and creates and uploads credentials. This information is stored as appropriate in embedded databases 301D, 301E of each MLS client 121, 123, respectively.

In at least one embodiment, process 300 depicted in FIG. 3 employs the following socket connections:
- MLS clients 121, 123 to AS database 301A
- MLS clients 121, 123 to AS 124 code
- MLS clients 121, 123 to embedded databases 301D, 301E, respectively MLS DS Registration Referring now to FIG. 4, there is shown a block diagram depicting process 400, in which registration with MLS delivery/directory server (DS) 125 is performed. MLS DS 125 includes database 301B that stores information indicating which participants are members of a group, which may be a secure messaging group such as a WhatsApp group. In at least one embodiment, ratchet trees are employed, such as that depicted in FIG. 15, so that every time a new entity joins a group, a new set of keys can be added. In at least one embodiment, MLS DS 125 maintains both forward secrecy and post-compromise secrecy.

In at least one embodiment, registration process 400 depicted in FIG. 4 is performed following successful registration with MLS AS 124 as described above in connection with FIG. 3. In at least one embodiment, InstallCredential code 302 performs registration process 400 as depicted in FIG. 4. Configuration file (MFA token) 221 (created in process 200 depicted in FIG. 2) contains IP addresses for DS database 301B, and also contains the capabilities for each client 121, 123, as determined by administrator 222 in initial process 200 as depicted in FIG. 2.

In at least one embodiment, process 400 depicted in FIG. 4 includes the following steps:
- InstallCredential code 302 creates private keys for hybrid public key encryption (HPKE) (not shown), and also creates MLS initial key packages; these are stored in MLS DS database 301B.
- Private HPKE keys, as well as decisions on client capabilities, are stored in embedded databases 301D, 301E of each MLS client 121, 123, respectively.

Figure 5:
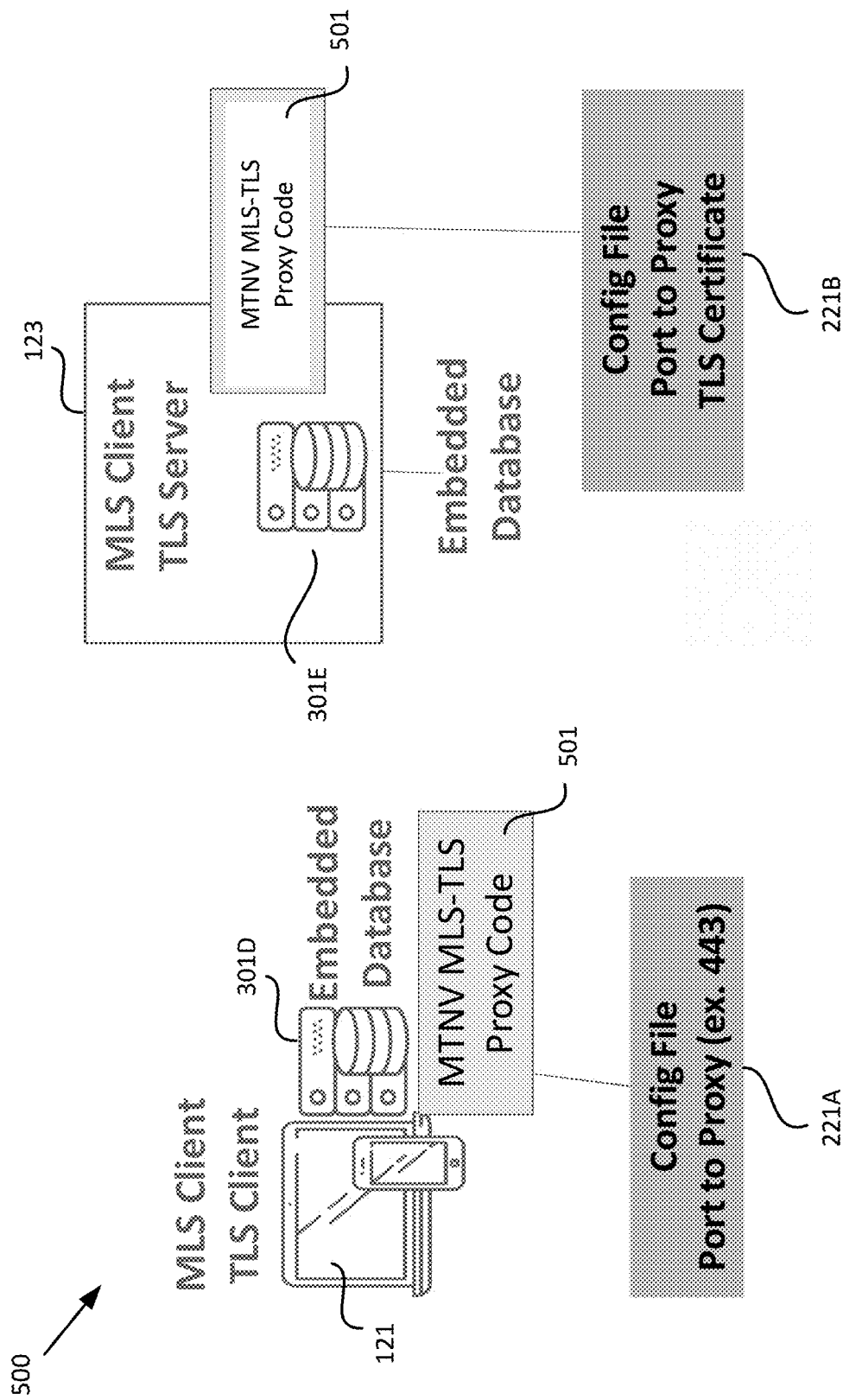
FIG. 5 is a block diagram depicting installation and configuration of an MTNV Messaging Layer Security—Transport Layer Security (MLS-TLS) proxy, according to one embodiment.

In at least one embodiment, process 400 depicted in FIG. 4 employs the following socket connections:
- MLS clients 121, 123 to DS database 301B
- MLS clients 121, 123 to embedded databases 301D, 301E, respectively MTNV MLS-TLS Proxy Installation and Configuration Referring now to FIG. 5, there is shown a block diagram depicting process 500 in which an MTNV MLS-TLS proxy is installed and configured.

In at least one embodiment, registration process 500 is performed following successful registration 400 with MLS DS 125 as depicted in connection with FIG. 4. MTNV MLS-TLS proxy code 501 is installed on MLS client-TLS client 121 and MLS client-TLS server 123. Proxy code 501 can be a standalone piece of software, browser extension (with addons), and/or the like. Configuration file(s) 221A and/or 221B created by administrator (human) 222 in process 200 depicted in FIG. 2 indicate(s) the port(s) to proxy. Each of MLS client-TLS client 121 and MLS client-TLS server 123 can have its own proxy code 501, or they can use the same proxy code 501.

In at least one embodiment, proxy code 501 runs as a service in the background, waiting to react when a TCP connection is established to the specified port(s).

In at least one embodiment, TLS certificate information exists in proxy code 501 when at the MLS client-TLS server 123 end.

Once the steps of FIG. 5 have been performed, proxy code 501 is ready to grab connections as they are established. Accordingly, if a client (such as client 121 or 123) attempts to connect to a website, the client is first wrapped into a group, and then the connection is made with the website.

Start TLS Session

Once the steps depicted in FIGS. 2 through 5 have been performed, the system is ready to accept connections.

Figure 6:
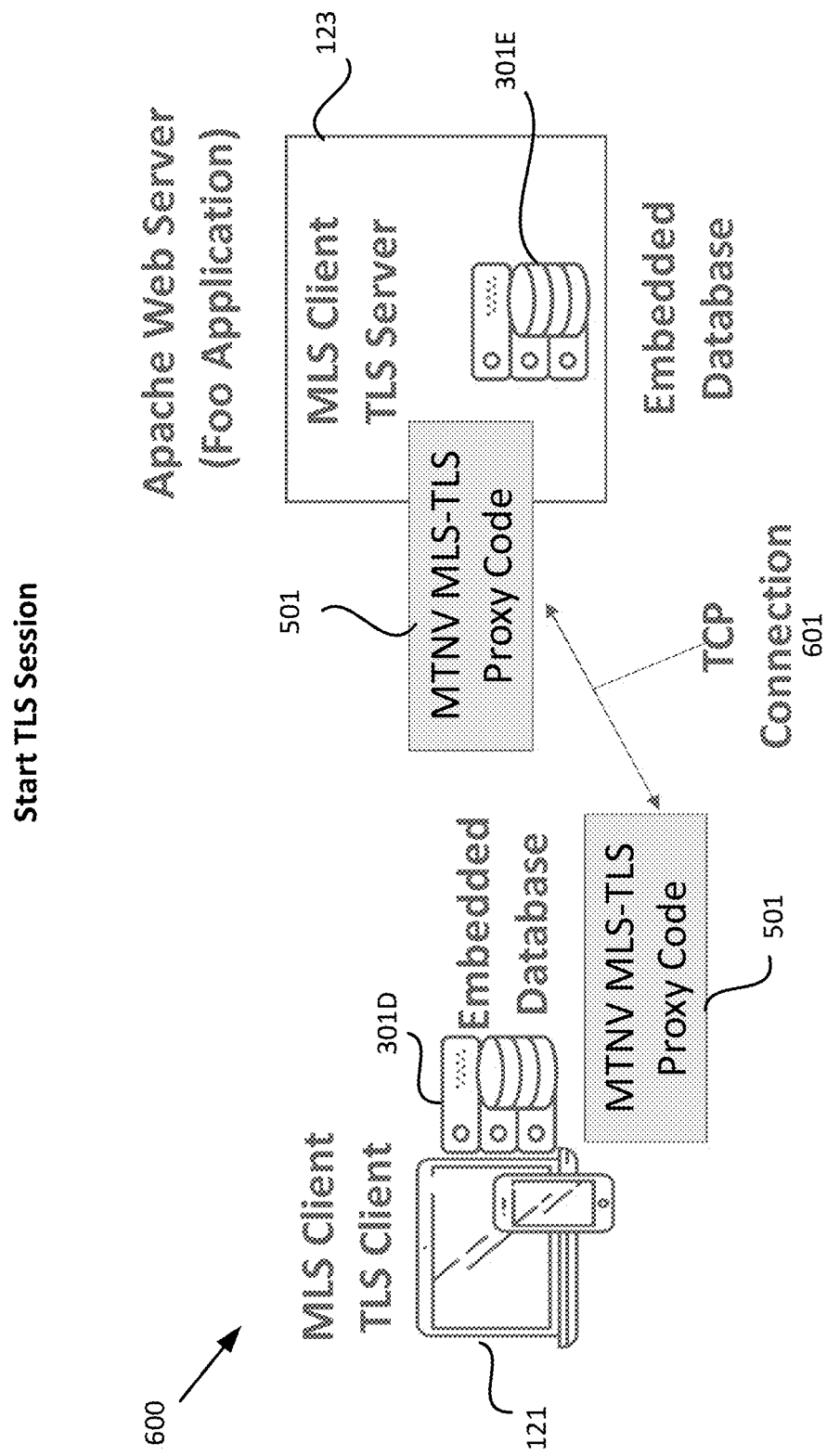
FIG. 6 is a block diagram depicting TLS session initiation, according to one embodiment.

Referring now to FIG. 6, there is shown a block diagram depicting process 600, which takes place when a TLS session is initiated. Here, MLS client-TLS client 121 wishes to perform some function which involves MLS client-TLS server 123.

For example, MLS client-TLS server 123 may be an Apache web server hosting an application, and MLS client-TLS client 121 may wish to perform an HTTPS query to this application, in order to start a TLS session. MTNV MLS-TLS proxy code 501 intercepts the connection request and routes it through the code provided by the described system, to create a group and thereby allow visibility to authenticated individuals. TCP connection 601 is established between proxy code 501 installed at components 121 and 123.

Secure key transport module 126 (not shown in FIG. 6) takes a portion of the TLS session key and saves it in a secure location with secret agent 128 (not shown in FIG. 6). At a later point, network devices that are authenticated to have this key for diagnostic or other purposes can securely obtain the key, as described in more detail below.

In at least one embodiment, process 600 depicted in FIG. 6 employs the following socket connection:

MTNV MLS-TLS proxy 501 installed at MLS client-TLS client 121 to MTNV MLS-TLS proxy 501 installed at MLS client-TLS server 123

Start MLS Group

Figure 7:
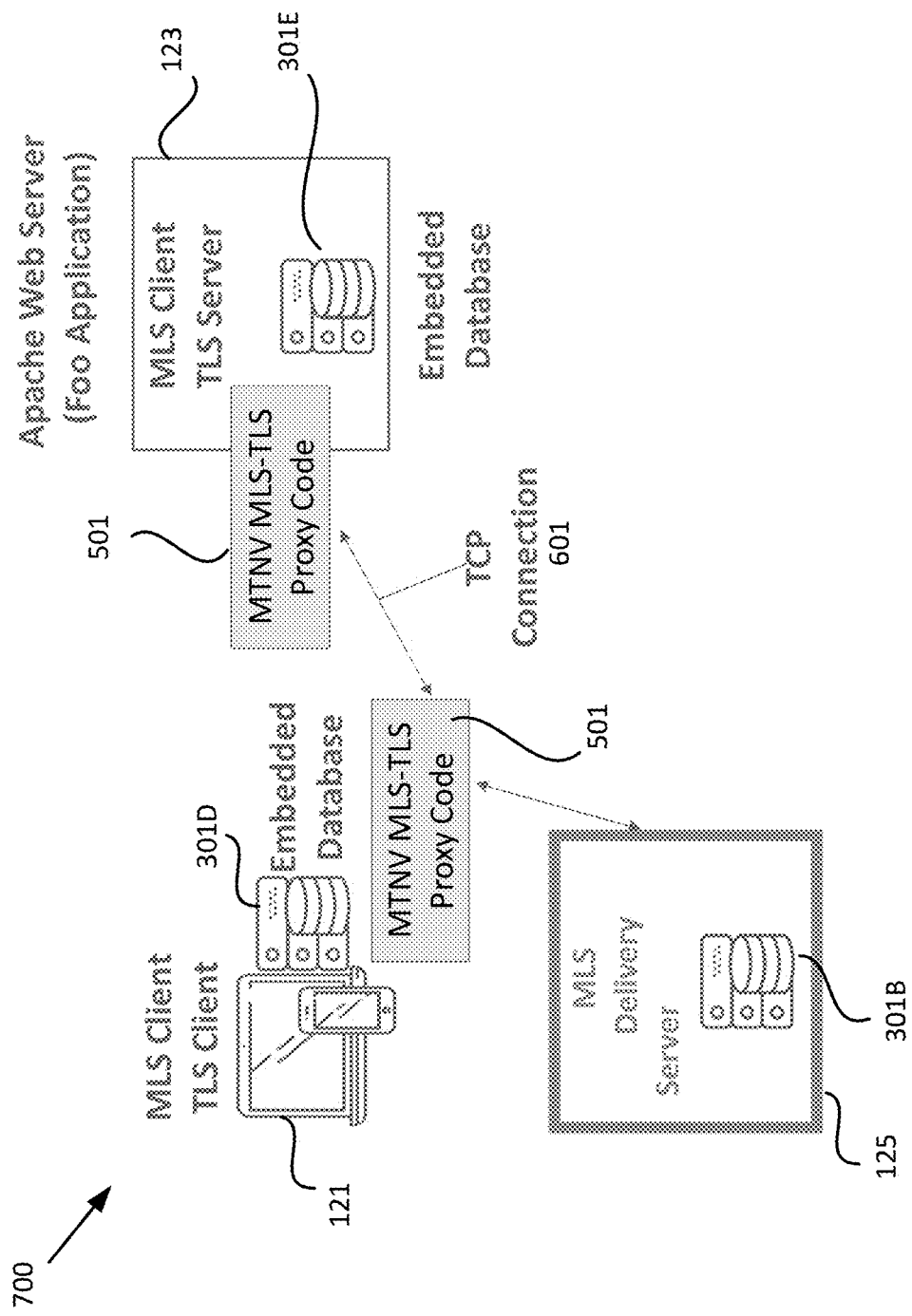
FIG. 7 is a block diagram depicting a process for starting an MLS group so as to allow visibility to authenticated individuals, according to one embodiment.

Referring now to FIG. 7, there is shown a block diagram depicting process 700 for starting an MLS group so as to allow visibility to authenticated individuals. The use of a key ensures that the visibility is provided only to authenticated individuals, since the payload of the TLS client/server connection is encrypted, and cannot be decrypted without the key. For example, the payload may include the HTTP address of the website client 121 is accessing, which can be valuable information for diagnostics. In at least one embodiment, MTNV MLS-TLS Proxy code 501 performs the following steps:

Create a new group.

Download the key package for TLS server 123 and add it to the group.

As a result of these steps, embedded databases 301D and/or 301 have a new ratchet tree, group context, secrets tree, private keys, and other information.

In at least one embodiment, process 700 depicted in FIG. 7 employs the following socket connections:

MTNV MLS-TLS proxy 501 installed at MLS client-TLS client 121 to MTNV MLS-TLS proxy 501 installed at MLS client-TLS server 123

MTNV MLS-TLS proxy 501 installed at MLS client-TLS client 121 to MLS DS database 301B

Add Secure Key Transport

Figure 8:
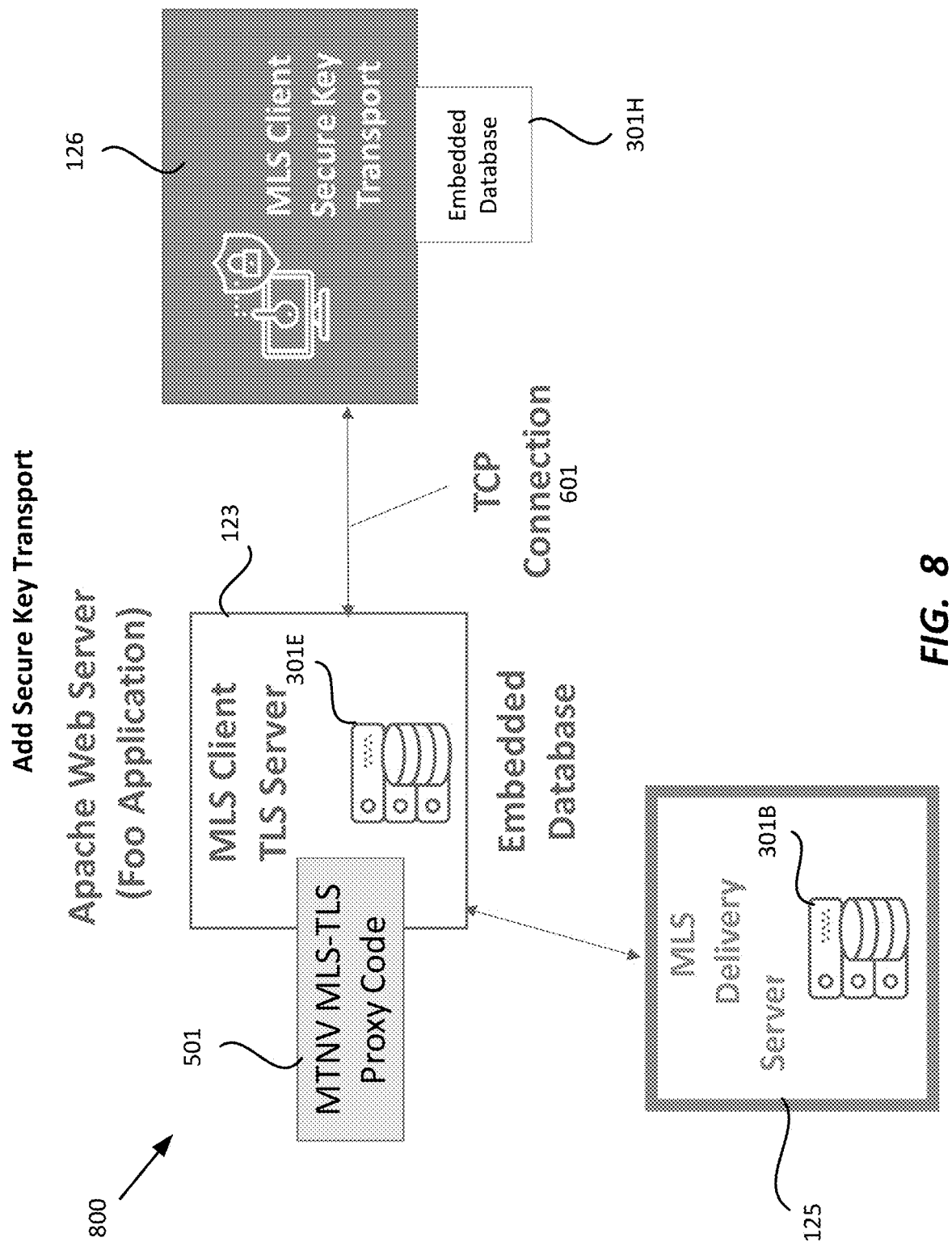
FIG. 8 is a block diagram depicting a process for adding secure key transport, according to one embodiment.

Referring now to FIG. 8, there is shown a block diagram depicting process 800 for adding MLS client secure key transport 126, which acts as the visibility agent. In at least one embodiment, MTNV MLS-TLS proxy code 501 in MLS client-TLS server 123 downloads the key package for MLS client secure key transport 126. MLS client secure key transport 126 now has an embedded database 301H including a new ratchet tree, group context, secrets tree, public keys, certificates, private keys, and other information. As a member of the group, MLS client-TLS client 121 (not shown in FIG. 8) is notified and updates its information as appropriate. MLS client-TLS client 121 may also add the secure key transport module 126 itself. Depending on the particular implementation, either the server or the client can add secure key transport module 126.

In at least one embodiment, the process depicted in FIG. 8 employs the following socket connection:

MTNV MLS-TLS proxy 501 installed at MLS client-TLS client 121 to MTNV MLS-TLS proxy 501 installed at MLS client-TLS server 123

MTNV MLS-TLS proxy 501 installed at MLS client-TLS server 123 to MLS DS Database 301B

Multi-Tier Endpoints Join

Figure 9:
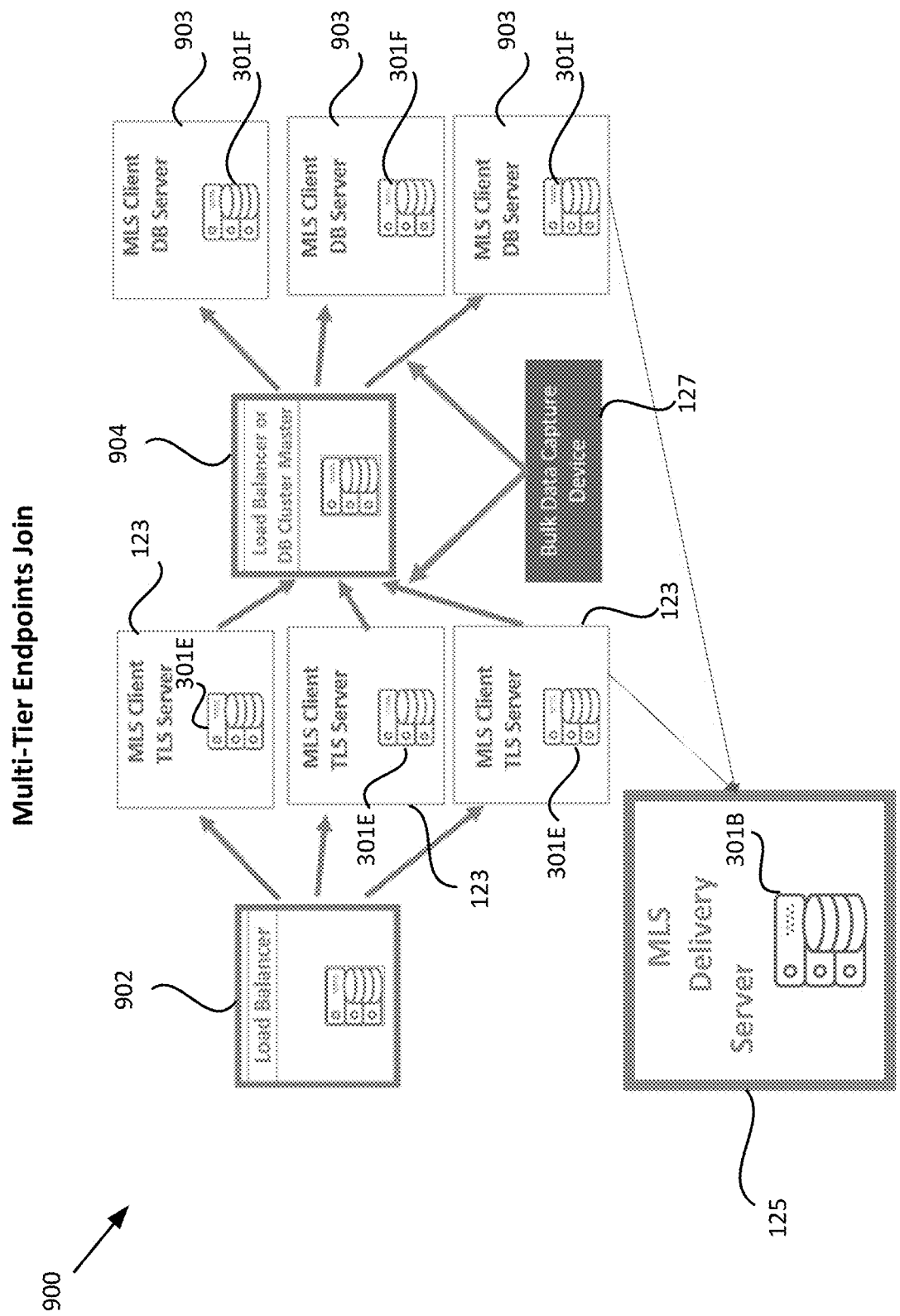
FIG. 9 is a block diagram depicting a process for handling a database query or similar function, according to one embodiment.

Referring now to FIG. 9, there is shown a block diagram depicting process 900 for handling a database query or similar function. In at least one embodiment, MLS client-TLS servers 123 handle such a query via a second TCP connection to one or more database server(s) 903 (which may be arranged as a cluster), each containing embedded database 301F. At this point, various MLS clients 123 have sent information that enables the system to provide visibility as to existing connections.

A client/server relationship is created with the former TLS server, which now becomes a TLS client to database server(s) 903. This is referred to as a tier-2 connection; in at least one embodiment, there can be any number of tiers.

MTNV MLS-TLS proxy code 501 (not shown in FIG. 9) intercepts the connection and routes it through the code described herein, so as to enable visibility. New clients 123 are added to the existing group. Component 904 may be a load balancer (acting as a front-end for an application server) or a DB cluster master (acting as a front-end for a database server).

In at least one embodiment, process 900 depicted in FIG. 9 employs the following socket connections:

MTNV MLS-TLS proxy 501 (not shown in FIG. 9) installed at MLS client-TLS client 121 (not shown in FIG. 9) to MTNV MLS-TLS proxy 501 installed at MLS client-TLS server 123

Tier(n) client/server to MLS DS database 301B

Tier(n) Servers Added to Group

Figure 10:
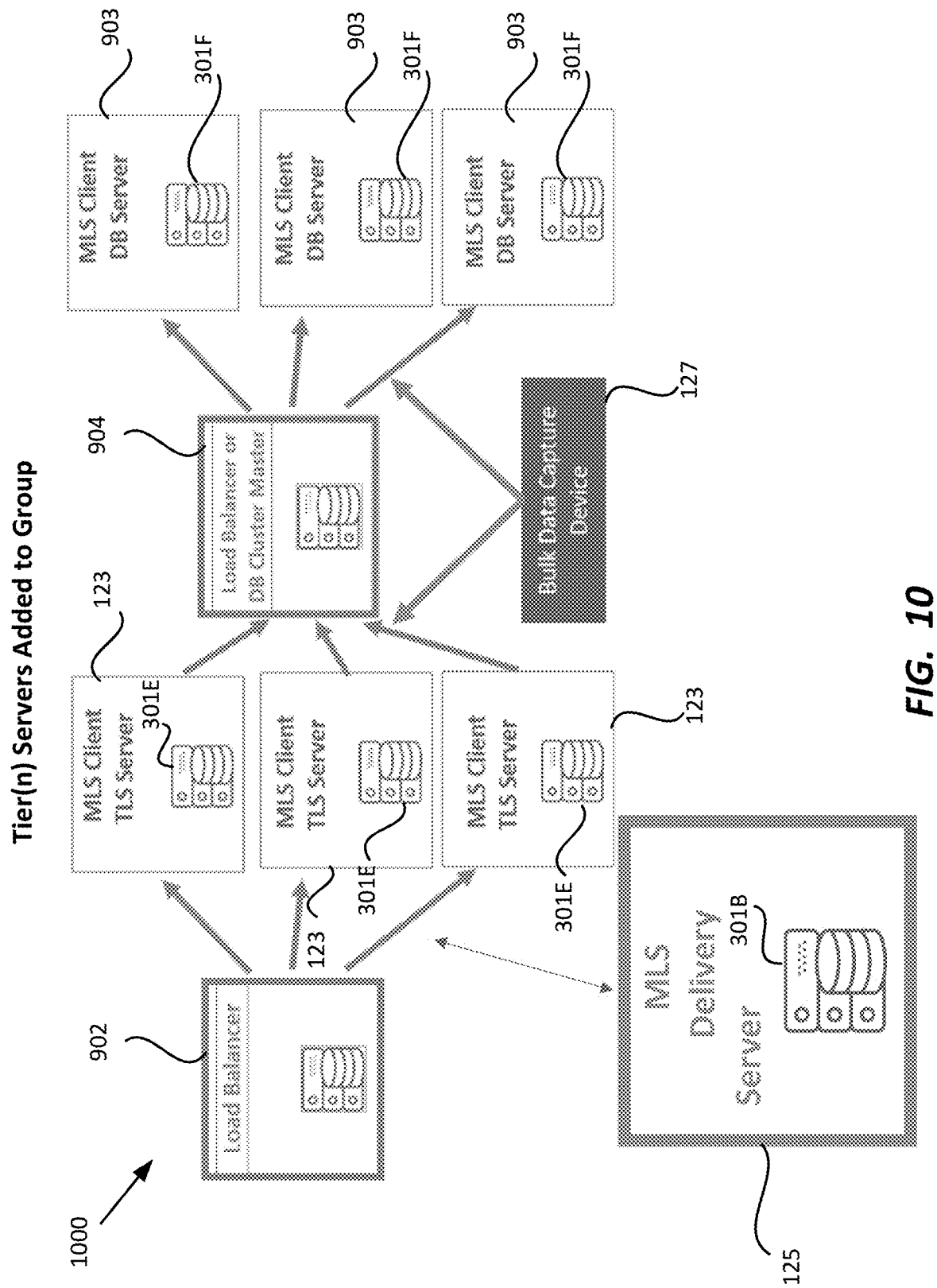
FIG. 10 is a block diagram depicting a process for adding a Tier(n) server to a group, according to one embodiment.

Referring now to FIG. 10, there is shown a block diagram depicting process 1000 for adding a Tier(n) server to the group. Any number of servers 123 can be added. In at least one embodiment, process 1000 is performed by new MLS client-TLS client 121 (not shown in FIG. 10), which adds MLS client-TLS server 123 to the group. MTNV MLS-TLS proxy code 501 (not shown in FIG. 10) in MLS client-TLS client 121 downloads the key package for MLS client-TLS server 123. New MLS client-TLS server 123 now has an embedded database 301E including a new ratchet tree, group context, secrets tree, private keys, public keys, certificates, and other information.

All other members of the group are notified and update their information. The epoch is incremented with each change to the group. At each epoch, a new set of secrets is created. This helps in providing forward and backward secrecy. In at least one embodiment, this operation may be done via a client pull method; thus, client 123 may at any time desire to know this information and can pull the information as desired.

In at least one embodiment, process 1000 depicted in FIG. 10 employs the following socket connections:
  MTNV MLS-TLS proxy 501 (not shown in FIG. 10) installed at MLS client-TLS client 121 (not shown in FIG. 10) to MTNV MLS-TLS proxy 501 installed at MLS client-TLS server 123
  MTNV MLS-TLS proxy 501 installed at MLS client-TLS server 123 to MLS DS database 301B

Multi-Tier Non-End-points

Figure 11:
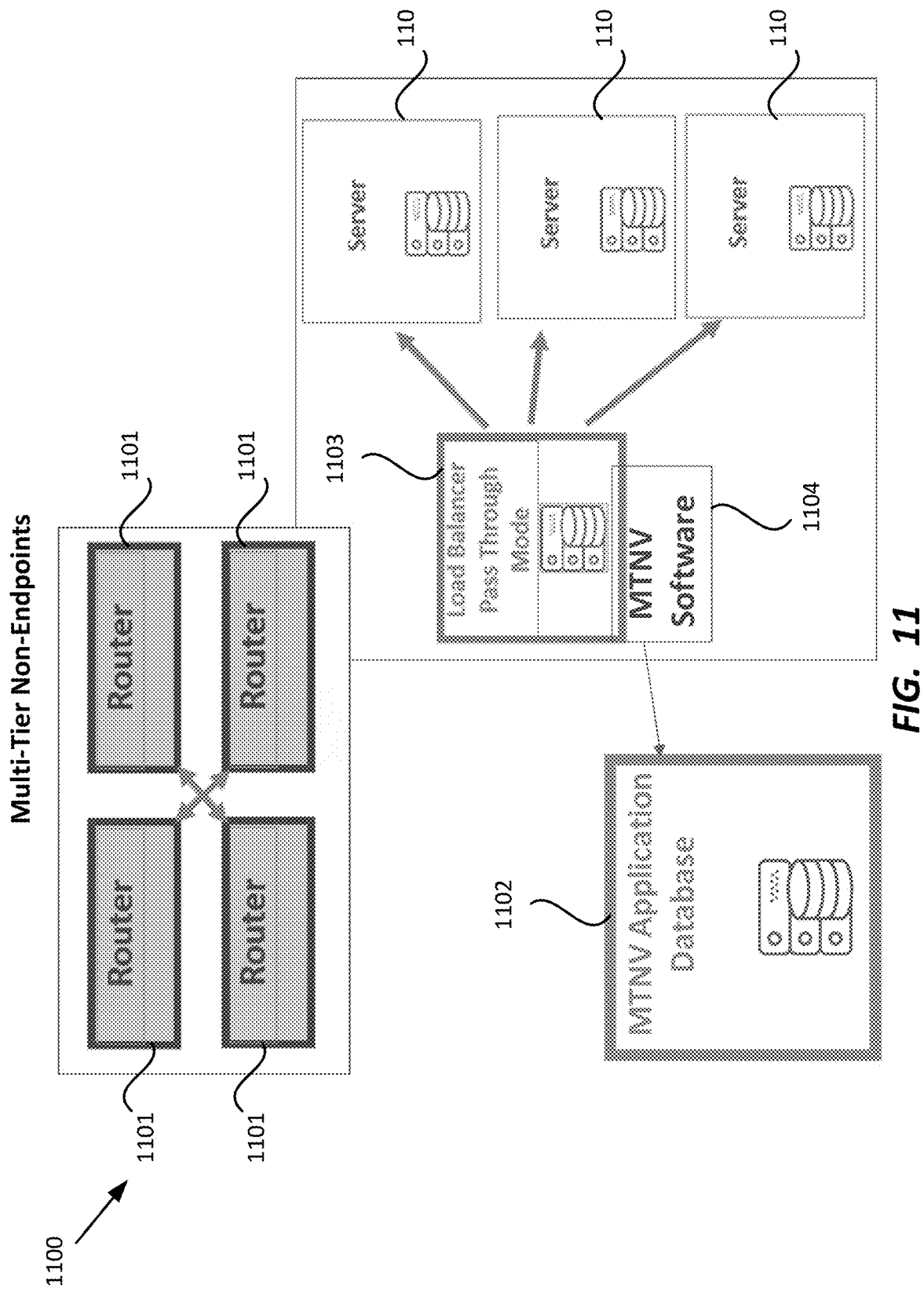
FIG. 11 is a block diagram depicting a process for handling devices that are not endpoints, according to one embodiment.

Referring now to FIG. 11, there is shown a block diagram depicting process 1100 for handling devices (such as routers 1101) that are not endpoints (i.e., they do not initiate or terminate a TCP connection). In one example, such devices need only return a PSK ID, Nonce, and/or other data in the TLS client Hello along with the 4-tuple to a database. Alternatively, such devices may use other signaling information to indicate that the connection has passed through the device. This helps to solidify the path information in dynamic connections. Such a technique may apply, for example, to load balancers, firewall clusters in pass-through mode, and/or the like.

For devices such as routers 1101, an IPv6 Hop-by-Hop or other IPv6 option can be used.

Load balancer passthrough module 1103, running MTNV software 1104, routes requests to servers 110. MTNV application database 1102 stores information collected by MTNV software 1104.

Diagnostics/Analytics

Figure 12:
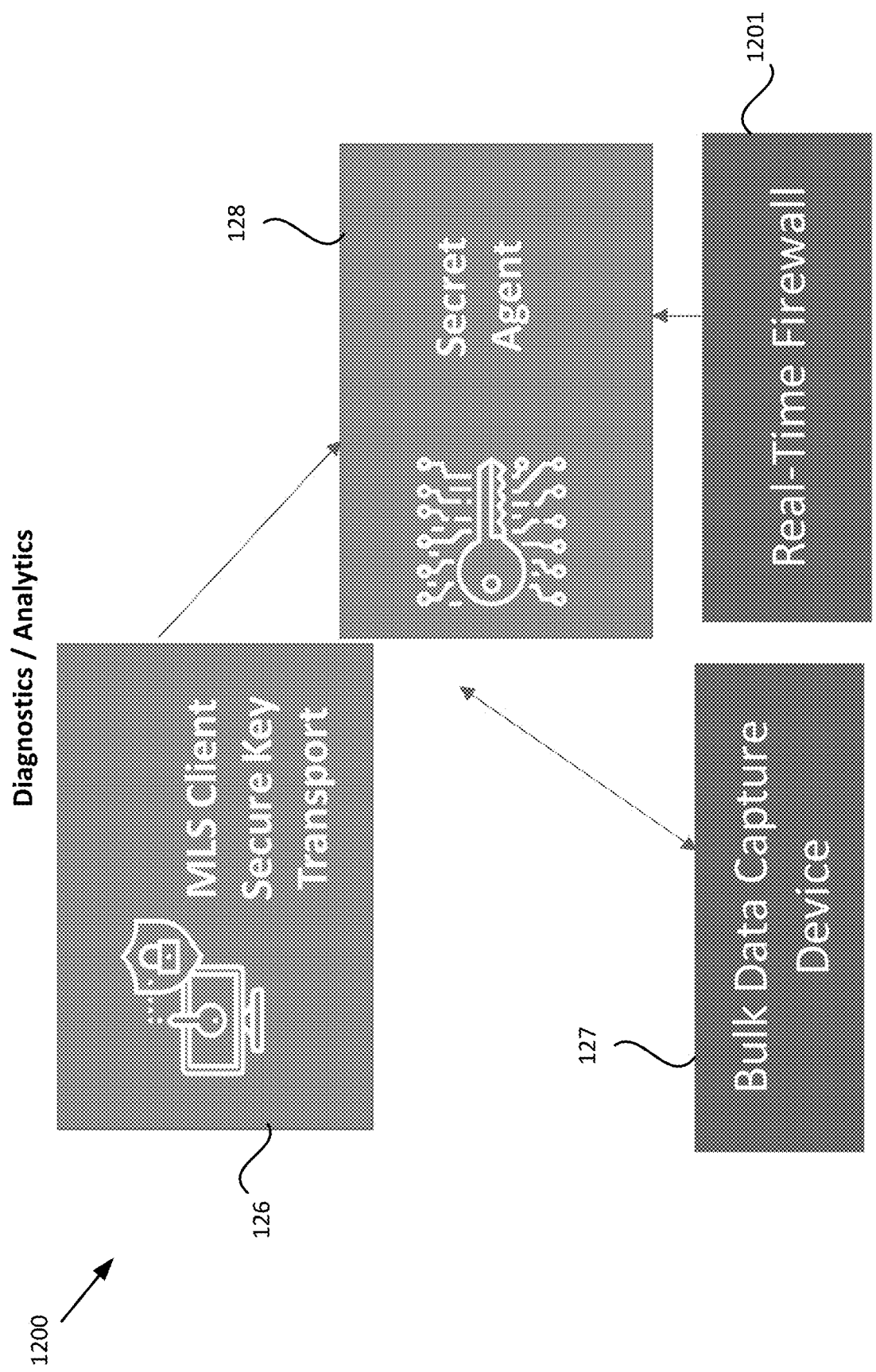
FIG. 12 is a block diagram depicting a process for generating diagnostics and/or analytics, according to one embodiment.

Referring now to FIG. 12, there is shown a block diagram depicting process 1200 for generating diagnostics and/or analytics.

Since MLS client secure key transport module 126 has been participating in all the created groups, it knows what is needed to be able to decrypt the MLS messages.

It also has a portion of the PSK, which can be combined with the Nonce (and other data) in the TLS client Hello to obtain the session key. The Client Hello is obtained from bulk data capture device 127. The keys for the TLS session may then be reconstructed.

In at least one embodiment, module 126 has very tight security access so as to prevent a scenario wherein a malicious sniffer on the network may be able to obtain packets which are then combined with the PSK material at module 126 to create the session key. Accordingly, in at least one embodiment, the HPKE private key on module 126 is securely held.

For after-the-fact diagnostics, all data can be held securely and offline.

For real-time diagnostics, an API can be provided to secret agent 128 for the appropriate devices. Any device added to the group does not have the TLS session key, so as to avoid a potential security violation that would allow a device that was able to break into the group to potentially send fraudulent packets over the TLS session. In at least one embodiment, devices on the group can only participate in the "Control" or MLS session, not the TLS session. To have access to the TLS key, they must validate with secret agent 128. Access to secret agent 128 is controlled via HSM 1406.

Secret agent 128 does not participate in the MLS group. There is a separation between the holders of the key and the TLS session itself.

In at least one embodiment, firewall 1201 may perform Deep Packet Inspection, for example to see if the user is going to a known malware site. In order to perform such inspection, firewall 1201 may be provided with access to the payload, which may be encrypted. Accordingly, firewall 1201 may be provided with the key to decrypt the payload. The key can be provided to firewall 1201 using the techniques described herein, thus providing an advantage over prior art schemes in which the key may be known only to a TLS client and server, and not to devices along the network path.

MLS Session State

In at least one embodiment, a participant knows:
  Its index in the identity and ratchet trees
  The private key of its key share, used to construct the leaf keys
  The private key associated with its identity key in the identity tree
  The current epoch number
  The group ID (GID)
  The co-path of its leaf in the identity tree
  The co-path of its leaf in the Asynchronous Ratcheting Tree (ART) or TreeKEM
  The message encryption secret
  The current add key pair
  The current init secret A Welcome message allows a component to maintain and communicate this information. In at least one embodiment, the Welcome message may have the following structure:

```
struct {
    opaque group_id<0..255>;
    uint64 epoch;
    optional<Node> tree<1..2^32-1>;
    opaque confirmed_transcript_hash<0..255>;
    opaque interim_transcript_hash<0..255>;
    Extensions extensions<0..2^16-1>;
    opaque confirmation<0..255>
    uint32 signer_index;
    opaque signature<0..2^16-1>;
} GroupInfo;
struct {
    opaque epoch_secret<1..255>;
    opaque path_secret<1..255>;
} GroupSecrets;
struct {
    opaque key_package_hash<1..255>;
    HPKECiphertext encrypted_group_secrets;
} EncryptedGroupSecrets;
struct {
    ProtocolVersion version = mls10;
    CipherSuite cipher_suite;
    EncryptedGroupSecrets secrets<0..2^32-1>;
    opaque encrypted_group_info<1..2^32-1>;
} Welcome;
```

PSK Computation

In at least one embodiment, the PSK generated by the described system contains a portion from the MLS session and a portion from the TLS session which uniquely identifies it. The portion from the TLS session is the "channel" or session binding.

In at least one embodiment, the PSK complies with the External PSK guidance draft, which can be found at https://datatracker.ietf.org/doc/draft-ietf-tls-external-psk-guidance/, and which states as follows:

"Each PSK SHOULD be derived from at least 128 bits of entropy, MUST be at least 128 bits long, and SHOULD be combined with a DH exchange for forward secrecy. As discussed in Section 3, low entropy PSKs, i.e., those derived from less than 128 bits of entropy, are subject to attack and SHOULD be avoided. Low entropy keys are only secure against active attack if a Password Authenticated Key Exchange (PAKE) is used with TLS.

"if a low entropy PSK is used, then PSK-only key establishment modes are subject to passive exhaustive search passive attacks which will reveal the traffic keys."

Hoyland PSK Computation

Hoyland defines the PSK as follows:

"The client constructs the PSK identifier as follows.

<group id; client index; server index; channel binding>

The server can identify the session and participants from the first three fields, and calculate the appropriate channel binding, to compare with the last field. The key used in the session is constructed from the secret portion of the root key."

"The first of our proposed measures is to require the channel binding to include a truncated copy of the ClientHello, specifically everything before the PSK IDs, including the client nonce."

HMAC(cs;<Truncate(ClientHello);
epoch;
group id;
cipher suite;
identity frontierS;
ratchet frontierS>)

Using Client Index and Server Index

In at least one embodiment, the system described herein modifies the above-described PSK construction as follows.

Hoyland proposes using the client index and server index in the PSK as:

"The client constructs the PSK identifier as follows.

<group id; client index; server index; channel binding>"

In at least one embodiment, a hash of the key package is used, encrypted with the group key for all three participants as:

<group id; HMAC(clientKeyPackage); HMAC(server-KeyPackage);
HMAC(SecureKeyTransportKeyPackage);
channel binding>

Constructing the Channel Binding

In at least one embodiment, the system deviates from the Hoyland construction for the channel binding.

Hoyland proposes:

"The first of our proposed measures is to require the channel binding to include a truncated copy of the ClientHello, specifically everything before the PSK IDs, including the client nonce."

HMAC(<Truncate(ClientHello);
epoch;
group id;
cipher suite;
identity frontierS;
ratchet frontierS>)

With a small ratchet tree, the frontiers also are likely to be small, if not actually static. The epoch is also likely to be small, as very few changes will have occurred. The epoch is updated with every change.

From the MLS protocol draft, Section 6.2:

"A member of a group authenticates the identities of other participants by means of credentials issued by some authentication system, like a PKI. Each type of credential MUST express the following data:

The public key of a signature key pair

The identity of the holder of the private key

The signature scheme that the holder will use to sign MLS messages

Credentials MAY also include information that allows a relying party to verify the identity/signing key binding.

```
enum {
    basic(0),
    x509(1),
    (255)
} CredentialType;
struct {
    opaque identity<0..2^16-1>;
    SignatureScheme algorithm;
    SignaturePublicKey public_key;
} BasicCredential;
struct {
    CredentialType credential_type;
    select (Credential.credential_type) {
    case basic:
    BasicCredential;
    case x509:
    opaque cert_data<1..2^24-1>;
};
} Credential;"
```

As secure key transport module 126 and secret agent 128 have access to the MLS credentials, the channel binding can be implemented as (cipher key used for encryption is the MLS group Secret):

```
HMAC(<Truncate(ClientHello);
ClientIdentity;
ServerIdentity;
SecureKeyTransportIdentity >)
```

Thus, the complete PSK is:

```
< group id; HMAC(clientKeyPackage);
HMAC(serverKeyPackage);
HMAC(SecureKeyTransportKeyPackage);
channel binding >
```

Prevention of Malware and Ransomware

In at least one embodiment, the system described herein, including the Multi-Tier Network Visibility (MTNV) product, may be used to prevent malware and/or ransomware from using TLS, another security protocol, or an unencrypted port.

In at least one embodiment, the following assumptions are made:

Enterprise uses MLS-TLS for all TLS connections

Enterprise uses MLS-xxx for all other connections (ex. MLS-SSH)

Malware is not authorized to use MTNV

Malware is not able to successfully bypass/control firewalls or take over control of the system Registration takes place as described above in connection with FIG. 2.

The configuration file contains:

The ports authorized to be used for TLS (or other desired protocol)

The processes and applications authorized to use that port

An example of such data is as follows:

Port 222: Process 12345 Application: AppName

Port 443: Chrome browser, IE Edge browser, etc.

One malware scenario is as follows. Malware has infected an endpoint system, and has placed a binary executable at the endpoint. The malware then tries to use TLS to do some mischief or to communicate with Command and Control. Any of several scenarios may take place.

Malware Scenario #1

The MTNV configuration file does not contain the TCP/UDP/other port the malware wishes to use. The result is that the malware is not allowed to communicate. The firewall or other device stops the communication.

Malware Scenario #2

The malware figures out that it is being blocked from using the port it wishes to use. It now examines the MTNV configuration and tries to use a TCP/UDP/other port that is defined.

However, the process ID/executable it wishes to use is not defined to the MTNV application as being a valid user of that port.

The result is that the malware is not allowed to communicate. The MTNV application stops the communication and reports the breach to the administrator.

Malware Scenario #3

The malware figures out that it is being blocked from using the port it wishes to use because it is not an authorized user of that port. It now examines the MTNV configuration and tries to use the appropriate process for the TCP/UDP/other port that is defined.

The MTNV application has taken an initial fingerprint of the process and notes that this new process is a duplicate or does not have the same characteristics.

The result is that the malware is not allowed to communicate. The MTNV stops the communication and reports the breach to the administrator.

Malware Scenario #4

The malware figures out that it is being blocked from using the port it wishes to use because it does not properly emulate an authorized process user of that port. It tries to take down the proper process and put itself in its place.

The MTNV application notes that a valid process has shut down. For example, the user may note that he or she can no longer use Chrome.

The result is that the malware is not allowed to communicate. The MTNV application stops the communication, and reports the breach to the administrator.

Malware Scenario #5

The malware now figures out that it is the MTNV application that is stopping it from doing its nefarious business. It tries to emulate the MTNV program.

Depending on how this is done, all TLS communication may stop.

The result is that the potential attack surface has been narrowed to the MTNV application and its associated data files.

In at least one embodiment, the MTNV can be protected from such an attack by, for example, using fingerprint authentication, monitoring selfbreaches, encrypting data, moving code in memory, and the like. For example, products such as OSQuery (https://osquery.readthedocs.io/en/latest/) do the following:

"OSQuery is an operating system instrumentation framework for Windows, OS X (macOS), Linux, and FreeBSD. The tools make lowlevel operating system analytics and monitoring both performant and intuitive.

"OSQuery exposes an operating system as a high-performance relational database. This allows you to write SQL queries to explore operating system data. With osquery, SQL tables represent abstract concepts such as running processes, loaded kernel modules, open network connections, browser plugins, hardware events or file hashes."

By using tools such as OSQuery, the MLS-Proxy code running in the client or server device can check for unexpected processes, intrusions, and the like.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Washington; MacOS, available from Apple Inc. of Cupertino, California; iOS, available from Apple Inc. of Cupertino, California; Android, available from Google, Inc. of Mountain View, California; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for securely providing visibility along an electronic communication path between two endpoints, comprising:
    establishing a secure separate channel in parallel to the electronic communication path;
    collecting information about at least one communication taking place between the two endpoints;
    encrypting the collected information;
    making the collected information available via the secure separate channel;
    obtaining a first portion of an authentication key;
    storing the first portion of the authentication key in a first secure storage device; and
    authenticating at least one party in order to provide the at least one party with access to the secure separate channel;
    wherein authenticating the at least one party comprises:
    retrieving the stored first portion of the authentication key;
    obtaining a second portion of the authentication key associated with a session;
    obtaining a key package from a second secure storage device;
    generating a hash result from a subset of data obtained from the communication taking place between the two endpoints;
    combining the first portion of the authentication key with the obtained key package and the generated hash result, to reconstruct the authentication key; and
    using the reconstructed authentication key to authenticate the at least one party and to decrypt the encrypted collected information.

2. The method of claim 1, wherein establishing a secure separate channel comprises establishing a group via a secure group messaging platform.

3. The method of claim 2, wherein the group comprises a WhatsApp group.

4. The method of claim 1, wherein retrieving the stored first portion of the authentication key, obtaining the second portion of the authentication key, obtaining the key package, and combining the first portion of the authentication key with the obtained key package and the generated hash result to reconstruct the authentication key are performed by a secret agent component.

5. The method of claim 1, wherein authenticating the at least one party using the authentication key comprises authenticating the at least one party using at least one selected from the group consisting of:
    an X-509 certificate; and
    thumb printing based on characteristics of at least one device used by the at least one party.

6. The method of claim 1, wherein providing the at least one party with access to the secure separate channel comprises:

receiving a request for information from the at least one party;
encrypting the requested information;
transmitting the encrypted information; and
decrypting the encrypted information.

7. The method of claim 6, wherein encrypting and decrypting the information are performed using a ratchet tree protocol.

8. The method of claim 1, wherein the first secure storage device comprises a hardware security module.

9. A non-transitory computer-readable medium for securely providing visibility along an electronic communication path between two endpoints, comprising instructions stored thereon, that when performed by a processor, perform the steps of:
  establishing a secure separate channel in parallel to the electronic communication path;
  collecting information about at least one communication taking place between the two endpoints;
  encrypting the collected information;
  making the collected information available via the secure separate channel;
  obtaining a first portion of an authentication key;
  causing the first portion of the authentication key to be stored in a first secure storage device; and
  authenticating at least one party in order to provide the at least one party with access to the secure separate channel;
  wherein authenticating the at least one party comprises:
  retrieving the stored first portion of the authentication key;
  obtaining a second portion of the authentication key associated with a session;
  obtaining a key package from a second secure storage device;
  generating a hash result from a subset of data obtained from the communication taking place between the two endpoints;
  combining the first portion of the authentication key with the obtained key package and the generated hash result, to reconstruct the authentication key; and
  using the reconstructed authentication key to authenticate the at least one party and to decrypt the encrypted collected information.

10. The non-transitory computer-readable medium of claim 9, wherein establishing a secure separate channel comprises establishing a group via a secure group messaging platform.

11. The non-transitory computer-readable medium of claim 10, wherein the group comprises a WhatsApp group.

12. The non-transitory computer-readable medium of claim 9, wherein retrieving the stored first portion of the authentication key, obtaining the second portion of the authentication key, obtaining the key package, and combining the first portion of the authentication key with the obtained key package and the generated hash result to reconstruct the authentication key are performed by a secret agent component.

13. The non-transitory computer-readable medium of claim 9, wherein authenticating the at least one party using the authentication key comprises authenticating the at least one party using at least one selected from the group consisting of:
  an X-509 certificate; and
  thumb printing based on characteristics of at least one device used by the at least one party.

14. The non-transitory computer-readable medium of claim 9, wherein providing the at least one party with access to the secure separate channel comprises:
  receiving a request for information from the at least one party;
  encrypting the requested information;
  transmitting the encrypted information; and
  decrypting the encrypted information.

15. The non-transitory computer-readable medium of claim 14, wherein encrypting and decrypting the information are performed using a ratchet tree protocol.

16. The non-transitory computer-readable medium of claim 9, wherein the first secure storage device comprises a hardware security module.

17. A system for securely providing visibility along an electronic communication path between two endpoints, comprising:
  a plurality of communication nodes, configured to establish a secure separate channel in parallel to the electronic communication path;
  a capture device, configured to collect, encrypt, and store information about at least one communication taking place between the two endpoints and further configured to make the collected information available via the secure separate channel; and
  a first secure storage device;
  an authentication module, communicatively coupled to the first secure storage device and to the capture device, configured to:
    obtain a first portion of an authentication key;
    cause the first portion of the first portion of the authentication key to be stored in the first secure storage device; and
    authenticate at least one party in order to provide the at least one party with access to the secure separate channel;
  wherein authenticating the at least one party comprises:
  retrieving the stored first portion of the authentication key;
  obtaining a second portion of the authentication key associated with a session;
  obtaining a key package from a second secure storage device;
  generating a hash result from a subset of data obtained from the communication taking place between the two endpoints;
  combining the first portion of the authentication key with the obtained key package and the generated hash result, to reconstruct the authentication key; and
  using the reconstructed authentication key to authenticate the at least one party and to decrypt the encrypted collected information.

18. The system of claim 17, wherein establishing a secure separate channel comprises establishing a group via a secure group messaging platform.

19. The system of claim 18, wherein the group comprises a WhatsApp group.

20. The system of claim 17, further comprising:
  a secret agent component;
  wherein retrieving the stored first portion of the authentication key, obtaining the second portion of the authentication key, obtaining the key package, and combining the first portion of the authentication key with the obtained key package and the generated hash result to reconstruct the authentication key are performed by the secret agent component.

21. The system of claim 17, wherein authenticating the at least one party using the authentication key comprises authenticating the at least one authorized party using at least one selected from the group consisting of:
   an X-509 certificate; and
   thumb printing based on characteristics of at least one device used by the at least one party.

22. The system of claim 17, wherein providing the at least one party with access to the secure separate channel comprises:
   receiving a request for information from the at least one party;
   encrypting the requested information;
   transmitting the encrypted information; and
   decrypting the encrypted information.

23. The system of claim 22, wherein encrypting and decrypting the information are performed using a ratchet tree protocol.

24. The system of claim 17, wherein the first secure storage device comprises a hardware security module.

* * * * *